(12) United States Patent
Takeda et al.

(10) Patent No.: US 10,934,867 B2
(45) Date of Patent: Mar. 2, 2021

(54) STATIONARY-BLADE-TYPE ROTATING MACHINE AND METHOD FOR ASSEMBLING STATIONARY-BLADE-TYPE ROTATING MACHINE

(71) Applicant: MITSUBISHI HEAVY INDUSTRIES ENGINE & TURBOCHARGER, LTD., Sagamihara (JP)

(72) Inventors: Kazuya Takeda, Tokyo (JP); Takashi Shiraishi, Tokyo (JP); Kazuki Okuda, Tokyo (JP); Takeshi Yoshimi, Tokyo (JP); Toshimasa Igusa, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 191 days.

(21) Appl. No.: 16/070,389

(22) PCT Filed: Jan. 20, 2016

(86) PCT No.: PCT/JP2016/051483
§ 371 (c)(1),
(2) Date: Jul. 16, 2018

(87) PCT Pub. No.: WO2017/126038
PCT Pub. Date: Jul. 27, 2017

(65) Prior Publication Data
US 2019/0024517 A1    Jan. 24, 2019

(51) Int. Cl.
*F01D 9/02*    (2006.01)
*F02B 39/00*    (2006.01)
(Continued)

(52) U.S. Cl.
CPC ............ *F01D 9/026* (2013.01); *F01D 11/005* (2013.01); *F01D 17/165* (2013.01); *F01D 25/24* (2013.01);
(Continued)

(58) Field of Classification Search
CPC ...... F01D 9/026; F01D 11/005; F01D 17/165; F01D 25/24; F04D 29/444; F04D 29/462;
(Continued)

(56) References Cited

U.S. PATENT DOCUMENTS 2,976,013 A * 3/1961 Ulrich .................... F01D 9/045
415/110
4,491,885 A  1/1985 Morikawa et al.
(Continued)

FOREIGN PATENT DOCUMENTS

CN    101255814 A    9/2008
CN    101598037 A    12/2009
(Continued)

OTHER PUBLICATIONS

Extended European Search Report dated Nov. 29, 2018 issued in the corresponding European Application No. 16886280.3.
(Continued)

*Primary Examiner* — David E Sosnowski
*Assistant Examiner* — Danielle M. Christensen
(74) *Attorney, Agent, or Firm* — Birch, Stewart, Kolasch & Birch, LLP.

(57) ABSTRACT

A stationary-blade-type rotating machine is provided with a rotational shaft, an impeller, an impeller housing having a scroll passage formed on an outer peripheral side of the impeller, a bearing housing connected to the impeller housing in an axial direction of the rotational shaft, a stationary blade disposed in a radial passage formed between the scroll passage and the impeller and defined by an impeller-hous- (Continued)

ing-side member and a bearing-housing-side member which face each other in the axial direction of the rotational shaft. The fixation unit includes an annular circumferential groove formed in an inner peripheral surface of the impeller housing and a ring-shaped fitting member subjected to a force for expanding in a radial direction while being fitted into the circumferential groove. The fitting member is configured to press the stationary blade to the impeller housing via at least one of the impeller-housing-side member or the bearing-housing-side member.

17 Claims, 17 Drawing Sheets

(51) Int. Cl.
  *F04D 29/08* (2006.01)
  *F04D 29/62* (2006.01)
  *F01D 17/16* (2006.01)
  *F04D 29/46* (2006.01)
  *F01D 11/00* (2006.01)
  *F04D 29/44* (2006.01)
  *F01D 25/24* (2006.01)
  *F02B 37/18* (2006.01)

(52) U.S. Cl.
  CPC .............. *F02B 37/18* (2013.01); *F02B 39/00* (2013.01); *F04D 29/083* (2013.01); *F04D 29/441* (2013.01); *F04D 29/444* (2013.01); *F04D 29/462* (2013.01); *F04D 29/624* (2013.01); *F05D 2220/40* (2013.01); *F05D 2230/642* (2013.01); *F05D 2230/644* (2013.01); *F05D 2240/14* (2013.01); *F05D 2240/55* (2013.01); *F05D 2250/52* (2013.01)

(58) Field of Classification Search
  CPC .... F04D 29/441; F04D 29/624; F04D 29/083; F05D 2220/40; F05D 2240/14
  See application file for complete search history.

(56) References Cited

U.S. PATENT DOCUMENTS

| | | | |
|---|---|---|---|
| 7,189,058 B2 * | 3/2007 | Metz | .................... F01D 11/003 415/165 |
| 2001/0017032 A1 | 8/2001 | Jinnai | |
| 2006/0034684 A1 | 2/2006 | Metz et al. | |
| 2006/0062663 A1 | 3/2006 | Figura et al. | |
| 2008/0223956 A1 | 9/2008 | Jinnai et al. | |
| 2010/0310365 A1 | 12/2010 | Matsuyama et al. | |
| 2013/0170975 A1 | 7/2013 | Ishii | |

FOREIGN PATENT DOCUMENTS

| | | |
|---|---|---|
| CN | 101946069 A | 1/2011 |
| JP | 57-131802 A | 8/1982 |
| JP | 9-268902 A | 10/1997 |
| JP | 5561368 B2 | 6/2014 |
| WO | WO 2009/046504 A1 | 9/2009 |

OTHER PUBLICATIONS

Office Action dated Aug. 21, 2019 issued in the corresponding European Application No. 16886280.3.

Chinese Office Action and Search Report, dated Sep. 27, 2019, for Chinese Application No. 201680079182.3, with an English translation.

Office Action issued in counterpart CN Application No. 201680079182.3 with Machine Translation.

* cited by examiner

A-A    B-B, C-C

STATIONARY-BLADE-TYPE ROTATING MACHINE AND METHOD FOR ASSEMBLING STATIONARY-BLADE-TYPE ROTATING MACHINE

TECHNICAL FIELD

The present disclosure relates to a stationary-blade-type rotating machine including a stationary blade and a method for assembling a stationary-blade-type rotating machine.

BACKGROUND ART

In a rotating machine such as a turbocharger and an electric compressor, a stationary-blade-type rotating machine including a stationary blade is used to improve the performance of the rotating machine.

To fix the stationary blade within a housing of the rotating machine, for instance, in a case of a large turbocharger without a waste-gate valve, a turbine housing is divided into multiple separate members including a scroll part, a shroud part, and an outlet flange part, and the stationary blade is inserted between the divided members and fixed with a bolt or the like. However, in a case of a small turbocharger or a turbocharger with a waste-gate valve, it is difficult to adopt such a fixation method in view of connection problems.

It is also conceivable that a supporting part which supports the stationary blade and extends in a radial direction is inserted between a turbine housing and a bearing housing and fixed with a bolt or the like. However, when the support part which supports the stationary blade extends in a radial direction, heat discharge from the stationary blade increases, and turbine efficiency decreases accordingly.

Thus, it is conceivable that the stationary blade is pressed and fixed within a housing, by fixing means such as a spring member. For instance, Patent Document 1 discloses an invention relating to a fixed-type turbocharger in which the stationary blade is pressed by a biasing force of a disc spring for sealing an outflow of a fluid, and thereby the stationary blade is fixed within a housing.

CITATION LIST

Patent Literature

Patent Document 1: JP55561368B

SUMMARY

Problems to be Solved

However, in the fixation method of Patent Document 1, the stationary blade is pressed to an inner wall surface of a turbine housing by a biasing force of a disc spring fitted into a fitting groove formed in a bearing housing. Thus, when the stationary blade is fixed within the housing, it is required that the disc spring is first fitted into the fitting groove of the bearing housing, the stationary blade is then pressed to the inner wall of the turbine housing by a biasing force of this disc spring, and the bearing housing and the turbine housing are fastened with a fastening ring in this state. That is, the stationary blade is not fixed within the housing until the bearing housing and the turbine housing are fastened with a fastening ring. Accordingly, there is a risk that the stationary blade is detached or inclines in the middle of fastening the bearing housing and the turbine housing, resulting in poor assemblability.

The present invention has been made in view of the above problems. An objection thereof is to provide a stationary-blade-type rotating machine with excellent assemblability which enables a stationary blade to be fixed within a housing with a simple method, and a method for assembling the stationary-blade-type rotating machine.

Solution to the Problems (1) A stationary-blade-type rotating machine according to an embodiment of the present invention comprises: a rotational shaft; an impeller mounted to the rotational shaft; an impeller housing accommodating the impeller and having therein a scroll passage formed on an outer peripheral side of the impeller; a bearing housing accommodating a bearing which rotatably supports the rotational shaft and connected to the impeller housing in an axial direction of the rotational shaft; a stationary blade disposed in a radial passage formed between the scroll passage and the impeller, the radial passage being defined by an impeller-housing-side member and a bearing-housing-side member which face each other in the axial direction of the rotational shaft; and a fixation unit pressing and thereby fixing the stationary blade to the impeller housing, wherein the fixation unit includes: an annular circumferential groove disposed in an inner peripheral surface of the impeller housing; and a ring-shaped fitting member subjected to a force to expand in a radial direction while being fitted into the circumferential groove, the fitting member being configured to press the stationary blade to the impeller housing via at least one of the impeller-housing-side member or the bearing-housing-side member.

The stationary-blade-type rotating machine according to the embodiments described in the above (1) is provided with a fixation unit including an annular circumferential groove formed on an inner peripheral surface of the impeller housing and a fitting member configured to press the stationary blade to the impeller housing via at least one of the impeller-housing-side member or the bearing-housing-side member in a state where the fitting member is fitted into the circumferential groove. With this fixation unit, the stationary blade is pressed and thereby fixed to the impeller housing.

In this configuration, when the ring-shaped fitting member is fitted into the circumferential groove formed on the inner peripheral surface of the impeller housing, the stationary blade is pressed to the impeller housing by a diameter expansion force (a force to expand in a radial direction) of the fitting member, and the stationary blade is thereby fixed within the housing. That is, unlike the above-described Patent Document 1, the stationary blade is not fixed within the housing by a fastening force to fasten the impeller housing and the bearing housing. Instead, the stationary blade is fixed within the impeller housing by the fitting member assembled within the turbine housing. Thus, it is possible to fix the stationary blade within the impeller housing, regardless of the connection between the impeller housing and the bearing housing. Therefore, this structure provides excellent assemblability of the stationary blade; for instance, this enables assembling after the stationary blade is fixed within the turbine housing.

Further, it is possible to reduce heat discharge from the stationary blade, compared with a case where a supporting part which supports the stationary blade and extends in a radial direction is inserted between the impeller housing and the bearing housing and fixed with a bolt or the like. Thus, it is possible to avoid the reduction in performance of the stationary-blade-type rotating machine.

(2) In some embodiments, in the stationary-blade-type rotating machine described in the above (1), one of side surfaces, which is farther away from the radial passage, of the circumferential groove is inclined toward the radial passage from an opening to a bottom surface of the circumferential groove. Additionally, an outer peripheral part, fitted into the circumferential groove, of the fitting member is shaped into a wedge.

In the embodiments described in the above (2), when the fitting member is fitted into the circumferential groove, the fitting member expands in a radial direction, so that the fitting member tries to move toward the radial passage. This increases the pressing force to press the stationary blade to the impeller housing and enables the stationary blade to be strongly fixed within the impeller housing.

(3) In some embodiments, in the stationary-blade-type rotating machine described in the above (1) or (2), the bearing-housing-side member is composed of a bearing-side plate member formed separately from the impeller housing and from the bearing housing. The circumferential groove is disposed on a bearing housing side with respect to the bearing-side plate member. Additionally, the fitting member is configured to press the stationary blade to the impeller housing via the bearing-side plate member.

In the embodiments described in the above (3), the bearing-housing-side member is composed of the bearing-side plate member formed separately from the impeller housing and from the bearing housing, and the circumferential groove is disposed on the bearing housing side with respect to the bearing-side plate member. Thus, when the fitting member is inserted from an opening on the bearing housing side into the impeller housing and the fitting member is fitted into the circumferential groove, the stationary blade is pressed to the impeller housing via the bearing-side plate member.

(4) In some embodiments, in the stationary-blade-type rotating machine described in the above (3), the impeller-housing-side member is composed of a shroud part which is a part of the impeller housing. Additionally, the fitting member is configured so that an inner peripheral part located on an inner peripheral side of an outer peripheral part of the fitting member abuts on the bearing-side plate member, and the stationary blade is pressed to the shroud part via the bearing-side plate member, in a state where the outer peripheral part of the fitting member is fitted into the circumferential groove.

In the embodiments described in the above (4), the impeller-housing-side member is composed of a radial-passage-side surface of the shroud part which is a part of the impeller housing. Thus, when the fitting member is inserted from the opening on the bearing housing side into the impeller housing and the fitting member is fitted into the circumferential groove, the inner peripheral part of the fitting member abuts on the bearing-side plate member. Consequently, the stationary blade can be pressed to the shroud part, which is a part of the impeller housing, via the bearing-side plate member.

(5) In some embodiments, in the stationary-blade-type rotating machine described in the above (4), the stationary blade and the bearing-side plate member are integrally formed.

In the embodiments described in the above (5), the stationary blade and the bearing-side plate member are prevented from shifting relative to each other when the stationary blade is pressed to the shroud part via the bearing-side plate member. Thus, it is possible to stably fix the stationary blade within the impeller housing.

(6) In some embodiments, in the stationary-blade-type rotating machine described in the above (4) or (5), an elastic member is mounted into a recess formed in a radial-passage-side surface of the shroud part. Additionally, an elastic force of the elastic member acts on the stationary blade.

In the embodiments described in the above (6), even if the stationary blade thermally expands due to a high-temperature exhaust gas or a compressed air, it is possible to absorb the thermal expansion by the elastic member. Accordingly, excessive thermal stress does not occur in the stationary blade, and the stationary blade can achieve excellent durability.

(7) In some embodiments, in the stationary-blade-type rotating machine described in any one of the above (3) to (6), an annular seal member is provided between the fitting member and the bearing-side plate member.

In the embodiments described in the above (7), it is possible to prevent the leakage of a high-temperature exhaust gas and a compressed air from a butting portion of the fitting member toward the bearing housing.

(8) In some embodiments, in the stationary-blade-type rotating machine described in the above (1) or (2), the impeller housing includes: a housing body having therein the scroll passage; and a shroud member formed separately from the housing body and mounted to an inner peripheral side of the housing body. Additionally, the impeller-housing-side member is composed of the shroud member. Additionally, the circumferential groove is disposed on an opposite side to the bearing housing with respect to the shroud member. Additionally, the fitting member is configured to press the stationary blade to the impeller housing via the shroud member.

In the embodiments described in the above (8), the impeller-housing-side member is composed of the shroud member formed separately from the housing body and mounted to an inner peripheral side of the housing body, and the circumferential groove is disposed on an opposite side to the bearing housing with respect to the shroud member. Thus, when the fitting member is inserted from an opening (outlet opening) opposite to the opening on the bearing housing side into the impeller housing and the fitting member is fitted into the circumferential groove, the stationary blade is pressed to the impeller housing via the shroud member.

Compared with the embodiments described in the above (3), these embodiments enable the fitting member to be located at a position where the temperature of the exhaust gas and the compressed air is lower. Thus, the fitting member can be made of a material having low heat resistance, compared with the embodiments described in the above (3).

(9) In some embodiments, in the stationary-blade-type rotating machine described in the above (8), the bearing-housing-side member is composed of a bearing-side plate member formed separately from the impeller housing and from the bearing housing. Additionally, a projection projecting from an inner peripheral surface of the impeller housing is formed on a bearing housing side with respect to the bearing-side plate member. Additionally, the fitting member is configured so that an inner peripheral part located on an inner peripheral side of an outer peripheral part of the fitting member abuts on the shroud member, and the stationary blade is pressed to the projection via the shroud member and the bearing-side plate member, in a state where the outer peripheral part of the fitting member is fitted into the circumferential groove.

In the embodiments described in the above (9), the bearing-housing-side member is composed of the bearing-side plate member formed separately from the impeller housing and from the bearing housing, and the projection projecting from the inner peripheral surface of the impeller housing is disposed on the bearing housing side of the bearing-side plate member. Thus, when the fitting member is inserted from the opening (outlet opening) opposite to the opening on the bearing housing side into the impeller housing and the fitting member is fitted into the circumferential groove, the inner peripheral part of the fitting member abuts on the shroud member. Consequently, the stationary blade can be pressed to the projection of the impeller housing via the shroud part and the bearing-side plate member.

(10) In some embodiments, in the stationary-blade-type rotating machine described in the above (9), the stationary blade and the shroud member are integrally formed.

In the embodiments described in the above (10), the stationary blade and the shroud member are prevented from shifting, relative to each other when the stationary blade is pressed to the projection via the shroud member and the bearing-side plate member. Thus, it is possible to stably fix the stationary blade within the impeller housing.

(11) In some embodiments, in the stationary-blade-type rotating machine described in the above (9), the stationary blade and the bearing-side plate member are integrally formed.

In the embodiments described in the above (11), the stationary blade and the bearing-side plate member are prevented from shifting relative to each other when the stationary blade is pressed to the projection via the shroud member and the bearing-side plate member. Thus, it is possible to stably fix the stationary blade within the impeller housing.

(12) In some embodiments, in the stationary-blade-type rotating machine described in the above (9), the stationary blade, the shroud member, and the bearing-side plate member are integrally formed.

In the embodiments described in the above (12), the stationary blade, the shroud member, and the bearing-side plate member are prevented from shifting relative to each other when the stationary blade is pressed to the projection via the shroud member and the bearing-side plate member. Thus, it is possible to stably fix the stationary blade within the impeller housing.

In some embodiments, in the stationary-blade-type rotating machine described in any one of the above (9) to (12), the impeller is composed of a turbine impeller configured to rotate by an exhaust gas discharged from an engine, and the impeller housing is composed of a turbine housing accommodating the turbine impeller. Additionally, the turbine housing has therein a bypass passage bypassing the turbine impeller and communicating with an upstream side of the scroll passage and a downstream side of the turbine impeller. The stationary-blade-type rotating machine further comprises: a diffuser member forming a diffuser passage through which the exhaust gas flowing from the turbine impeller flows; and a waste-gate valve, disposed radially outward of the diffuser member, for opening and closing the bypass passage. Further, the shroud member and the diffuser member are integrally formed.

In the embodiments described in the above (13), the diffuser member can be fixed within the turbine housing by fixing the shroud member within the turbine housing. Thus, excellent assemblability can be achieved.

(14) In some embodiments, in the stationary-blade-type rotating machine described in any one of the above (9) to (12), an elastic member is provided between the projection and the bearing-side plate member.

In the embodiments described in the above (14), even if, for instance, the stationary blade thermally expands due to a high-temperature exhaust gas or a compressed air, it is possible to absorb the thermal expansion by the elastic member. Accordingly, excessive thermal stress does not occur in the stationary blade, and the stationary blade can achieve excellent durability.

(15) In some embodiments, in the stationary-blade-type rotating machine described in any one of the above (3) to (7), the fitting member has a butting portion including a first end and a second end which face each other. A protrusion is formed in a back surface of the bearing-side plate member. Additionally, the fitting member is configured so that the protrusion of the bearing-side plate member is positioned at the butting portion of the fitting member in a state where the fitting member is fitted into the circumferential groove.

In the embodiments described in the above (15), when the fitting member is rotated in the circumferential groove, the first end and the second end of the fitting member abut on the protrusion of the bearing-side plate member. Thus, it is possible to prevent rotation of the fitting member fitted into the circumferential groove.

(16) In some embodiments, in the stationary-blade-type rotating machine described in any one of the above (8) to (14), the fitting member has a butting portion including a first end and a second end which face each other. A protrusion is formed in a back surface of the shroud member. Additionally, the fitting member is configured so that the protrusion of the shroud member is positioned at the butting portion of the fitting member in a state where the fitting member is fitted into the circumferential groove.

In the embodiments described in the above (16), when the fitting member is rotated in the circumferential groove, the first end and the second end of the fitting member abut on the protrusion of the shroud member. Thus, it is possible to prevent rotation of the fitting member fitted into the circumferential groove.

(17) Furthermore, according to an embodiment of the present invention, there is provided a method for assembling a stationary-blade-type rotating machine, the stationary-blade-type rotating machine including: a rotational shaft; an impeller mounted to the rotational shaft; an impeller housing accommodating the impeller and having therein a scroll passage formed on an outer peripheral side of the impeller; a bearing housing accommodating a bearing which rotatably supports the rotational shaft and connected to the impeller housing in an axial direction of the rotational shaft; a stationary blade disposed in a radial passage formed between the scroll passage and the impeller, the radial passage being defined by an impeller-housing-side member and a bearing-housing-side member which face each other in the axial direction of the rotational shaft; and a fixation unit pressing and thereby fixing the stationary blade to the impeller housing, the fixation unit including: an annular circumferential groove disposed in an inner peripheral surface of the impeller housing; and a ring-shaped fitting member subjected to a force to expand in a radial direction while being fitted into the circumferential groove, the fitting member being configured to press the stationary blade to the impeller housing via at least one of the impeller-housing-side member or the bearing-housing-side member, the bearing-housing-side member being composed of a bearing-side plate member formed separately from the impeller housing and from the bearing housing, the circumferential groove being disposed on a bearing housing side with respect to the bearing-side plate member, the method comprising: an inserting step of inserting the bearing-side plate member from an opening on a bearing housing side of the impeller housing into the impeller housing; and a fitting step of inserting the fitting member from the opening into the impeller housing and fitting the fitting member into the circumferential groove.

In this embodiment, the fitting member is inserted from an opening on the bearing housing side into the impeller housing and the fitting member is fitted into the circumferential groove. This enables the stationary blade to be pressed to the impeller housing via the bearing-side plate member and thereby fixed.

(18) Furthermore, according to an embodiment of the present invention, there is provided a method for assembling a stationary-blade-type rotating machine, the stationary-blade-type rotating machine including: a rotational shaft; an impeller mounted to the rotational shaft; an impeller housing accommodating the impeller and having therein a scroll passage formed on an outer peripheral side of the impeller; a bearing housing accommodating a bearing which rotatably supports the rotational shaft and connected to the impeller housing in an axial direction of the rotational shaft; a stationary blade disposed in a radial passage formed between the scroll passage and the impeller, the radial passage being defined by an impeller-housing-side member and a bearing-housing-side member which face each other in the axial direction of the rotational shaft; and a fixation unit pressing and thereby fixing the stationary blade to the impeller housing, the fixation unit including: an annular circumferential groove disposed in an inner peripheral surface of the impeller housing; and a ring-shaped fitting member subjected to a force to expand in a radial direction while being fitted into the circumferential groove, the fitting member being configured to press the stationary blade to the impeller housing via at least one of the impeller-housing-side member or the bearing-housing-side member, the impeller housing being composed of a housing body having therein the scroll passage and a shroud member formed separately from the housing body, the shroud member being mounted to an inner peripheral side of the housing body, the impeller-housing-side member being composed of the shroud member, the circumferential groove being disposed on an opposite side to the bearing housing with respect to the shroud member, the method comprising: an inserting step of inserting the shroud member from an opening opposite to a bearing-housing-side opening of the impeller housing into the impeller housing; and a fitting step of inserting the fitting member from the opening into the impeller housing and fitting the fitting member into the circumferential groove.

In this embodiment, the fitting member is inserted from an opening (outlet opening) opposite to the opening on the bearing housing side into the impeller housing and the fitting member is fitted into the circumferential groove. This enables the stationary blade to be pressed to the impeller housing via the shroud member and thereby fixed.

Advantageous Effects

According to at least one embodiment of the present invention, there can be provided a stationary-blade-type rotating machine with excellent assemblability which enables a stationary blade to be fixed within a housing with a simple method.

DETAILED DESCRIPTION

Figure 1A:
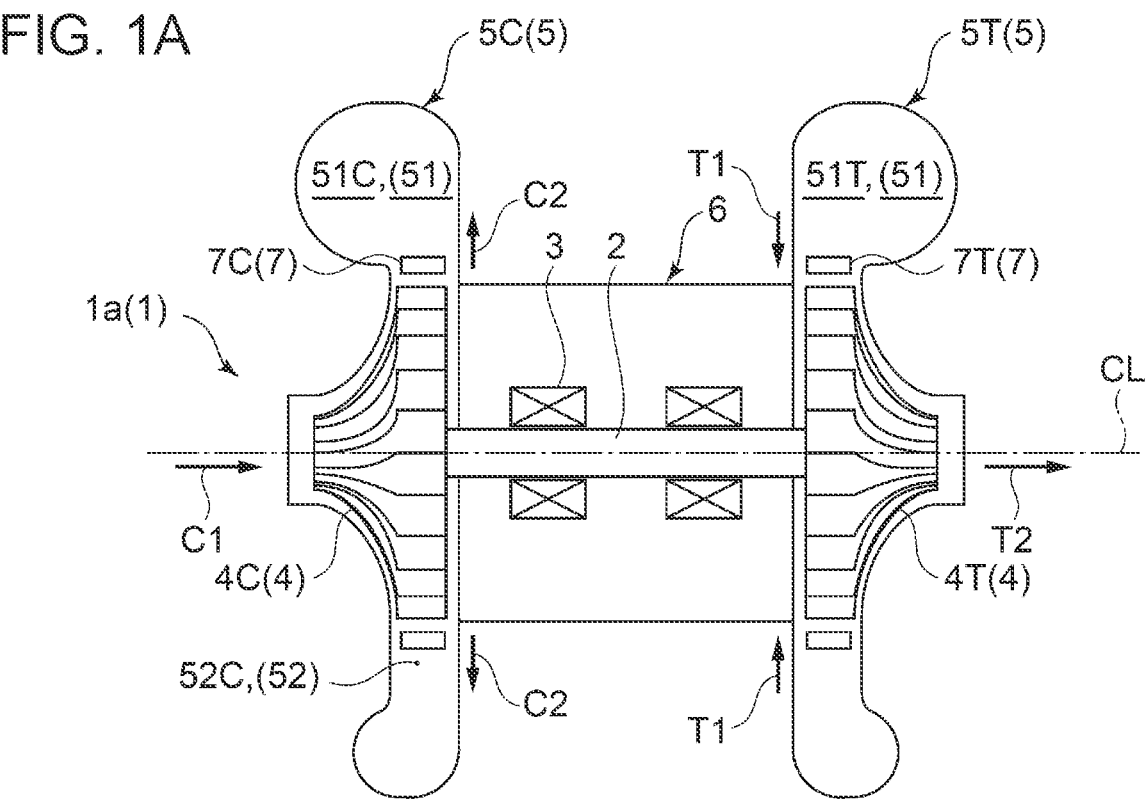
FIG. 1 are each a schematic diagram of a stationary-blade-type rotating machine according to an embodiment of the present invention.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

Figure 1B:
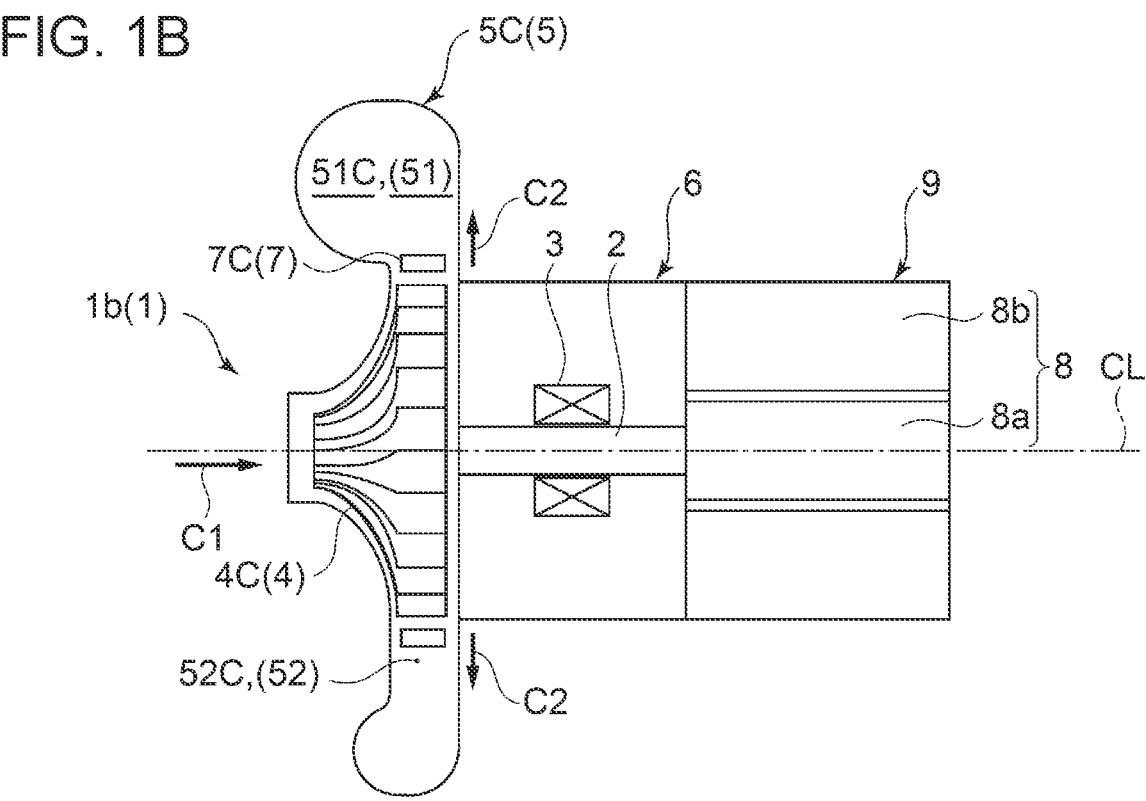
Figure 2:
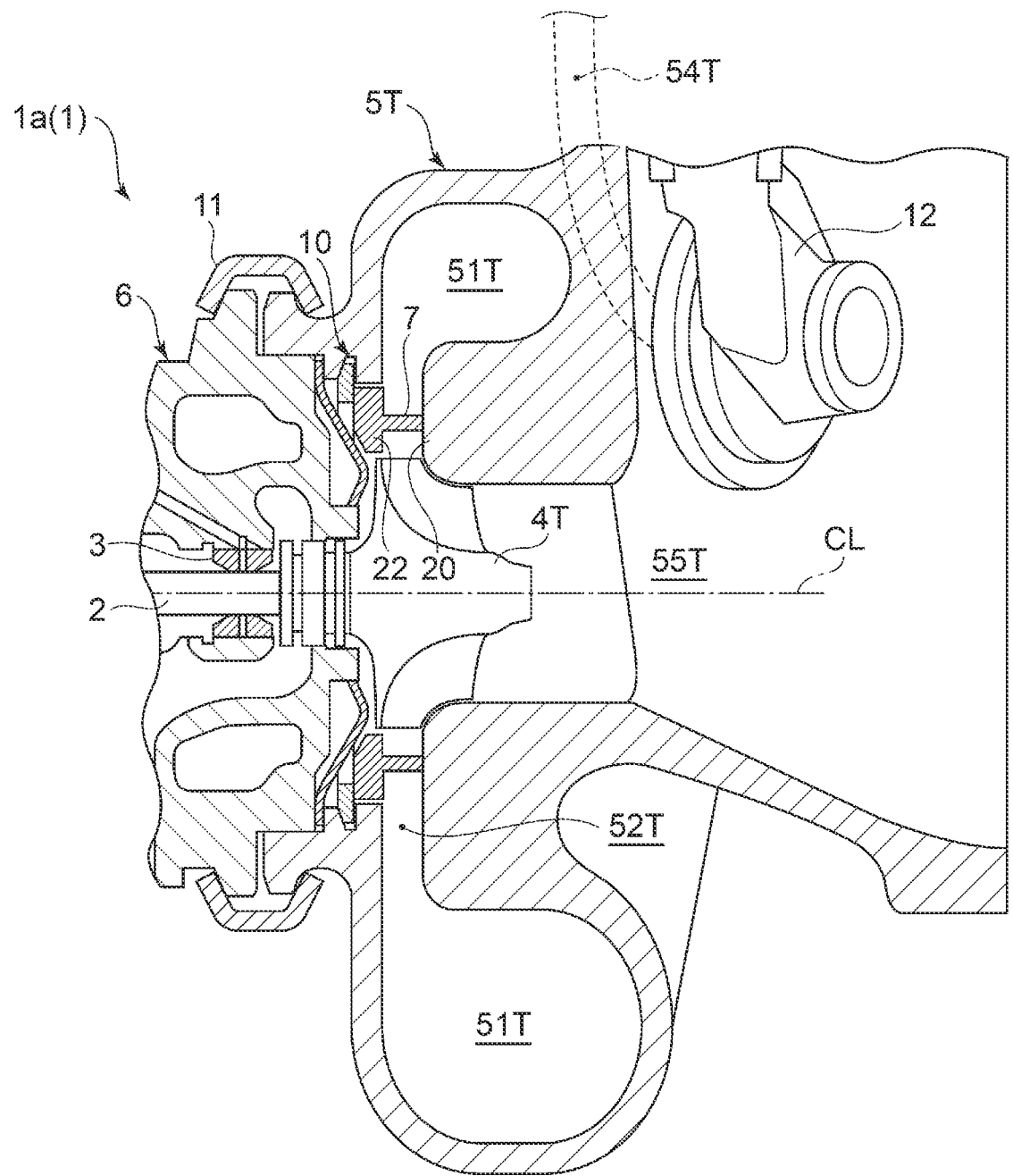
FIG. 2 is a cross-sectional view of a turbine side of a turbocharger according to an embodiment of the present invention.

FIG. 1 are each a schematic diagram of a stationary-blade-type rotating machine according to an embodiment of the present invention. FIG. 1A is a schematic diagram of an embodiment in which the stationary-blade-type rotating machine (fixed-nozzle-type rotating machine) 1 is constituted by a turbocharger 1a. FIG. 1B is a schematic diagram of an embodiment in which the stationary-blade-type rotating machine 1 is constituted by an electric compressor 1b. FIG. 2 is a cross-sectional view of a turbine side of a turbocharger according to an embodiment of the present invention.

As shown in FIGS. 1 and 2, the stationary-blade-type rotating machine 1 according to an embodiment of the present invention includes a rotational shaft 2, an impeller 4, an impeller housing 5, a bearing housing 6, a stationary blade 7, and a fixation unit 10.

The rotational shaft 2 is rotatable around an axis CL.

The impeller 4 is mounted to the rotational shaft 2 and is rotatable together with the rotational shaft 2 around the axis CL.

In the turbocharger 1a shown in FIG. 1A, a compressor impeller 4C is mounted to one end of the rotational shaft 2, and a turbine impeller 4T is mounted to the other end of the rotational shaft 2.

In the electric compressor 1b shown in FIG. 1B, a compressor impeller 4C is mounted to one end of the rotational shaft 2. To the other end of the rotational shaft 2, an electric motor 8 including a rotor 8a and a stator 8b is connected. The electric motor 8 is accommodated in a motor housing 9 and is configured to rotate the rotational shaft 2.

The impeller housing 5 accommodates the impeller 4 and has a spiral scroll passage 51 located on an outer peripheral side of the impeller 4.

The turbocharger 1a shown in FIG. 1A includes a compressor housing 5C accommodating the compressor impeller 4C and a turbine housing 5T accommodating the turbine impeller 4T. The compressor housing 5C has therein a compressor-side scroll passage 51C formed on an outer peripheral side of the compressor impeller 4C. The turbine housing 5T has therein a turbine-side scroll passage 51T formed on an outer peripheral side of the turbine impeller 4T.

The electric compressor 1b shown in FIG. 1B includes a compressor housing 5C accommodating the compressor impeller 4C. The compressor housing 5C has therein a compressor-side scroll passage 51C formed on an outer peripheral side of the compressor impeller 4C.

The bearing housing 6 accommodates a bearing 3 supporting the rotational shaft 2 rotatably and is coupled to the impeller housing 5 in a direction along the axis CL of the rotational shaft 2.

In the turbocharger 1a shown in FIG. 1A, the bearing housing 6 is disposed between the compressor housing 5C and the turbine housing 5T and coupled to the compressor housing 5C and the turbine housing 5T in the direction along the axis CL of the rotational shaft 2. Furthermore, in the embodiment shown in FIG. 2, the turbine housing 5T and the bearing housing 6 are coupled with an annular fastening ring 11 in the axis CL direction.

In the electric compressor 1b shown in FIG. 1B, the bearing housing 6 is disposed between the compressor housing 5C and the motor housing 9 and coupled to the compressor housing 5C and the motor housing 9 in the direction along the axis CL of the rotational shaft 2.

The stationary blade 7 is disposed between the scroll passage 51 and the impeller 4 and in a radial passage 52 which extends in a radial direction. The radial passage 52 is defined by an impeller-housing-side member 20 and a bearing-housing-side member 22, described later, which are disposed to face each other in the direction along the axis CL of the rotational shaft 2. The radial passage 52 is annularly formed on an outer peripheral side of the impeller 4. The stationary blade 7 is fixed between the impeller-housing-side member 20 and the bearing-housing-side member 22, and a plurality of the stationary blades 7 is disposed at a distance in a circumferential direction of the radial passage 52.

In the embodiments shown in FIGS. 1A and 1B, air is introduced from the outside of the compressor housing 5C into the compressor housing 5C along the axis CL direction, as shown by the arrow C1. The introduced air is compressed by the compressor impeller 4C, is discharged in a direction (radial direction) orthogonal to the axis CL as shown by the arrow C2, and passes through a compressor-side radial passage 52C. Then, the air is sent to the compressor-side scroll passage 51C.

On the other hand, in the embodiment shown in FIG. 1A, in the turbine housing 5T, an exhaust gas introduced into the turbine-side scroll passage 51T passes through a turbine-side radial passage 52T and is sent to the turbine impeller 4T as shown by the arrow T1. Then, after the turbine impeller 4T is rotated, as shown by the arrow T2, the exhaust gas is discharged to the outside of the turbine housing 5T along the axis CL direction.

Furthermore, in the embodiment shown in FIG. 2, a bypass passage 54T is formed within the turbine housing. The bypass passage 54T bypasses the turbine impeller 4T and communicates with an upstream portion of the turbine-side scroll passage 51T and a downstream portion (outlet passage 55T) of the turbine impeller 4T. Additionally, a waste-gate valve 12 for opening and closing the bypass passage 54T is disposed on an outlet side of the bypass passage 54T. When the waste-gate valve 12 opens the bypass passage 54T, an exhaust gas flowing through the turbine-side scroll passage 51T does not flow into the turbine-side radial passage 52T but flows into the bypass passage 54T and is sent to the outlet passage 55T.

Next, with reference to FIGS. 3 to 5 and FIGS. 8 to 14, the fixation unit 10 will be described.

Figure 3:
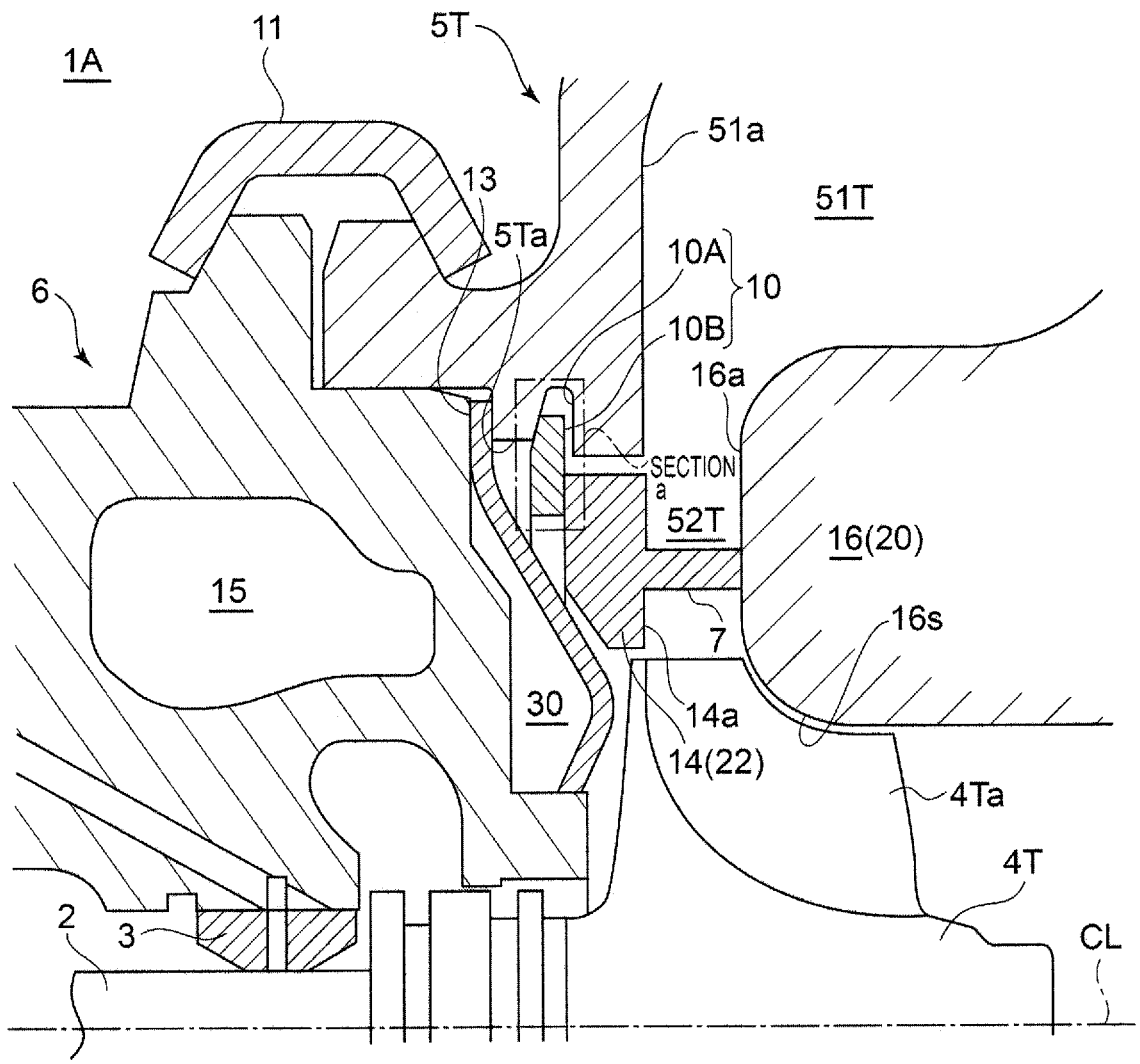
FIG. 3 is a cross-sectional view of a part of the turbocharger according to the embodiment shown in FIG. 2.
Figure 3:
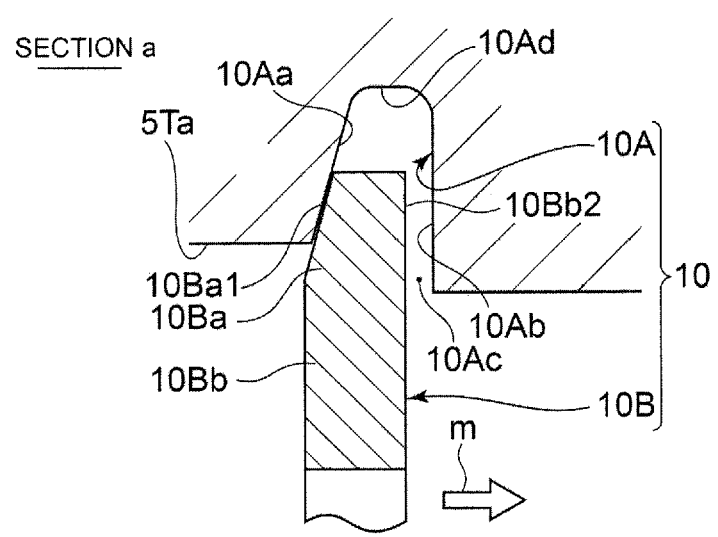
Figure 11:
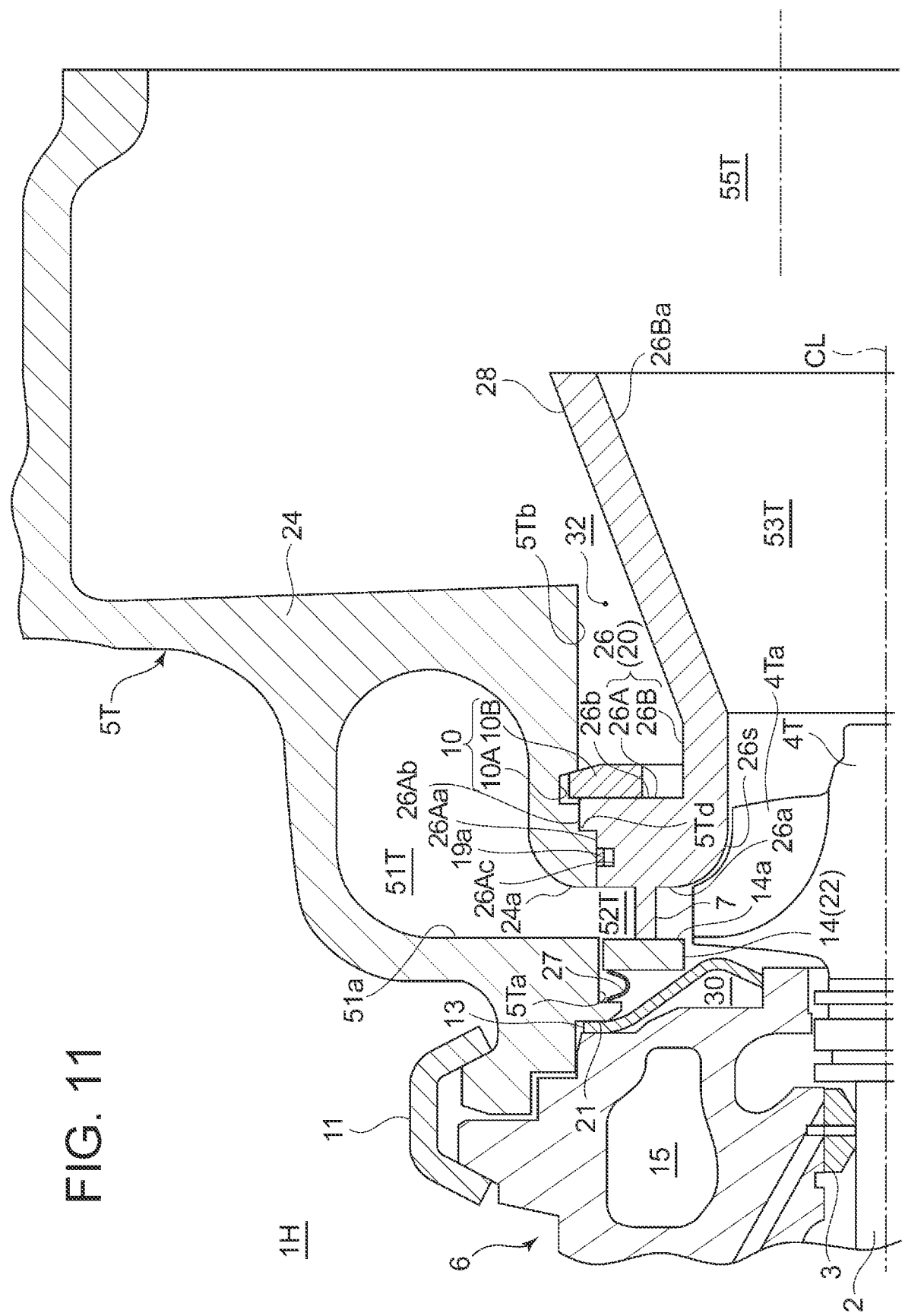
FIG. 11 is a cross-sectional view of a part of a turbocharger according to another embodiment.
Figure 12:
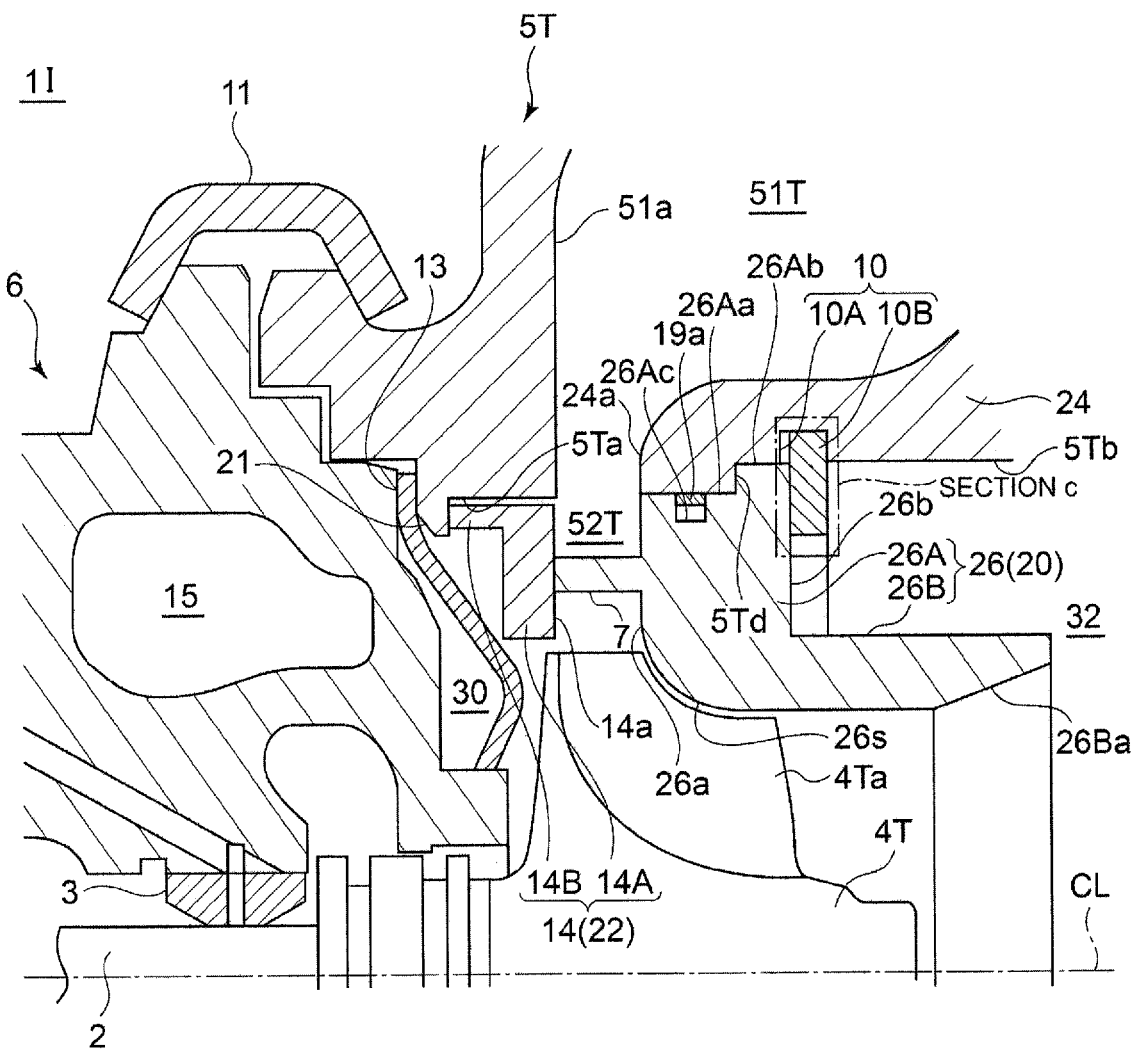
FIG. 12 is a cross-sectional view of a part of a turbocharger according to another embodiment.

FIG. 3 is a cross-sectional view of a part of the turbocharger according to the embodiment shown in FIG. 2. FIGS. 4 to 6 and 8 to 14 are each a cross-sectional view of a part of a turbocharger according to another embodiment. Section a in FIG. 3 is an enlarged view of a fixation unit according to the embodiments shown in FIGS. 3 to 7. Section b in FIG. 8 is an enlarged view of a fixation unit according to the embodiments shown in FIGS. 8 to 11. Section c in FIG. 12 is an enlarged view of a fixation unit according to the embodiments shown in FIGS. 12 to 14.

While the embodiments in FIGS. 3 to 6 and FIGS. 8 to 14 show a case where the stationary-blade-type rotating machine 1 of the present invention is used in a turbine-side portion 1A to 1K of the turbocharger 1a, the present invention is not limited thereto. The stationary-blade-type rotating machine 1 of the present invention may be used in a compressor-side portion of the turbocharger 1a or a compressor-side portion of the electric compressor 1b.

The fixation unit 10 is configured to press and fix the above-described stationary blade 7 to the impeller housing 5.

More specifically, the fixation unit 10 includes, as shown in FIGS. 3 to 6 and FIGS. 8 to 14, an annular circumferential groove 10A formed in an inner peripheral surface 5Ta of the turbine housing 5T and a ring-shaped fitting member 10B configured to be subjected to a force to expand in a radial direction while being fitted into the circumferential groove 10A.

Figure 15A:
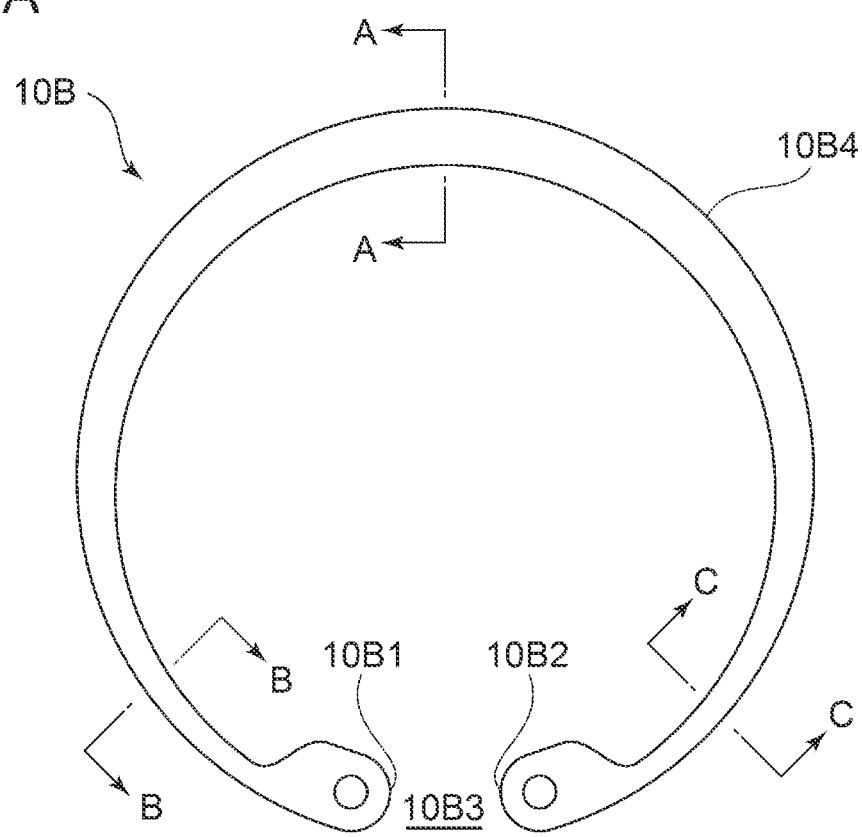
FIG. 15 are diagrams for describing a fitting member according to an embodiment of the present invention.
Figure 15B:
Figure 15B:

FIG. 15 are diagrams for describing a fitting member according to an embodiment of the present invention: FIG. 15A is a front view of the fitting member; FIG. 15B is a cross-sectional view of the fitting member. As shown in FIG. 15, the fitting member 10B has a ring shape with a butting portion 10B3 including a first end 10B1 and a second end 10B2 which face each other. That is, the first end 10B1 and the second end 10B2 face each other with a distance therebetween. The fitting member 10B is fitted into the circumferential groove 10A in a state where the outer diameter of the fitting member 10B is decreased by elastic deformation of the fitting member 10B so that the first end 10B1 and the second end 10B2 approach each other (so that the butting portion 10B3 contracts). That is, the fitting member 10B is fitted into the circumferential groove 10A in a state where a force (diameter expansion force) for expansion in a radial direction is applied.

In the illustrated embodiment, an arc-shaped ring portion 10B4 connecting the first end 10B1 and the second end 10B2 has a smaller cross-sectional height at a position closer to the first end 10B1 or the second end 10B2. Thus, the fitting member 10B can be easily elastically deformed so that the first end 10B1 and the second end 10B2 approach each other.

Further, the fitting member 10B is configured to press the stationary blade 7 to the turbine housing 5T via at least one of the impeller-housing-side member 20 and the bearing-housing-side member 22, as shown in FIGS. 3 to 6 and FIGS. 8 to 14.

The fitting member 10B may be any member configured so that a force to expand the fitting member in a radial direction is applied when fitted into the circumferential groove 10A and is not limited to the above embodiment. For instance, the fitting member may be shaped such that a first end and a second end in a ring shape partially overlap in a circumferential direction, instead of forming the butting portion 10B3 including the first end 10B1 and the second end 10B2 which face each other.

In the embodiments shown in FIGS. 3 to 6, the above-described bearing-housing-side member 22 is composed of a bearing-side plate member 14 formed separately from the turbine housing 5T and from the bearing housing 6. Further, the fitting member 10B is configured to press the stationary blade 7 to the turbine housing 5T via the bearing-side plate member 14.

In the embodiments shown in FIGS. 8 to 14, as described later, the turbine housing 5T includes a housing body 24 having therein the turbine-side scroll passage 51T and a shroud member 26 formed separately from the housing body 24 and mounted to an inner peripheral side of the housing body 24. Further, the above-described bearing-housing-side member 22 is composed of the bearing-side plate member 14 formed separately from the turbine housing 5T and from the bearing housing 6, and the above-described impeller-housing-side member 20 is composed of the shroud member 26. The fitting member 10B is configured to press the stationary blade 7 to the turbine housing 5T via the shroud member 26 and the bearing-side plate member 14.

In FIGS. 3 to 6 and FIGS. 8 to 14, the reference sign 13 denotes a back plate. The back plate 13 is an annular plate member disposed on an outer peripheral side of the rotational shaft 2. This member prevents the leakage of an exhaust gas flowing through the turbine-side radial passage 52T toward a back surface of the turbine impeller 4T and prevents an exhaust gas flowing through the turbine-side radial passage 52T from being transferred to the bearing housing 6. The outer peripheral edge of the back plate 13 is sandwiched between the turbine housing 5T and the bearing housing 6, and thereby the back plate 13 is fixed within the housing. In FIGS. 3 to 6 and FIGS. 8 to 14, the reference sign 15 denotes a cooling passage.

The stationary-blade-type rotating machine 1 (turbocharger 1A to 1K) according to an embodiment of the present invention with the above configuration is provided with a fixation unit 10 including an annular circumferential groove 10A formed on an inner peripheral surface 5Ta, 5Tb of the turbine housing 5T and a fitting member 10B configured to press the stationary blade 7 to the turbine housing 5T via at least one of the impeller-housing-side member 20 or the bearing-housing-side member 22 in a state where the fitting member 10B is fitted into the circumferential groove 10A. With this fixation unit 10, the stationary blade 7 is pressed and thereby fixed to the turbine housing 5T.

In this configuration, when the ring-shaped fitting member 10B is fitted into the circumferential groove 10A formed on the inner peripheral surface 5Ta, 5Tb of the turbine housing 5T, the stationary blade 7 is pressed to the turbine housing 5T by a diameter expansion force (a force to expand in a radial direction) of the fitting member 10B, and the stationary blade 7 is thereby fixed within the housing. That is, the stationary blade 7 is not fixed within the housing by a fastening force to fasten the turbine housing 5T and the bearing housing 6. Instead, the stationary blade 7 is fixed within the turbine housing 5T by the fitting member 10B assembled within the turbine housing, 5T. Thus, it is possible to fix the stationary blade 7 within the turbine housing 5T, regardless of the connection between the turbine housing 5T and the bearing housing 6. Therefore, this structure provides excellent assemblability of the stationary blade 7; for instance, this enables assembling after the stationary blade 7 is fixed within the turbine housing 5T.

Further, it is possible to reduce heat discharge from the stationary blade 7, compared with a case where a supporting part (not shown) which supports the stationary blade 7 and extends in a radial direction is inserted between the turbine housing 5T and the bearing housing 6 and fixed with a bolt or the like. Thus, it is possible to avoid the reduction in turbine efficiency.

In some embodiments, as shown in FIGS. 3 to 6 and FIGS. 8 to 11, one of side surfaces of the circumferential groove 10A, namely, a side surface 10Aa farther away from the turbine-side radial passage 52T is inclined toward the turbine-side radial passage 52T from an opening 10Ac to a bottom surface 10Ad of the circumferential groove 10A. Further, an outer peripheral part 10Ba of the fitting member 10B fitted into the circumferential groove 10A is shaped into a wedge.

In the illustrated embodiments, as enlargedly shown in section a of FIG. 3 and section b of FIG. 8, a side surface 10Ab opposite to the side surface 10Aa of the circumferential groove 10A extends perpendicular to the axis CL. A side surface 10Ba1 of the outer peripheral part 10Ba of the fitting member 10B is positioned so as to face the side surface 10Aa of the circumferential groove 10A and is inclined so as to be substantially parallel to the side surface 10Aa. A side surface 10Ba2 of the outer peripheral part 10Ba is positioned so as to face the side surface 10Ab of the circumferential groove 10A and is substantially parallel to the side surface 10Ab.

In the above-described embodiments, when the fitting member 10B is fitted into the circumferential groove 10A, the fitting member 10B expands in a radial direction, so that the fitting member 10B tries to move toward the turbine-side radial passage 52T as shown in the arrow m in the figures. This increases the pressing force to press the stationary blade 7 to the turbine housing 5T and enables the stationary blade 7 to be reliably fixed within the turbine housing 5T.

In some embodiments, as shown in FIGS. 3 to 6, the bearing-housing-side member 22 is composed of the bearing-side plate member 14 formed separately from the turbine housing 5T and from the bearing housing 6. The circumferential groove 10A is disposed on a bearing housing 6 side with respect to the bearing-side plate member 14. The fitting member 10B is configured to press the stationary blade 7 to the turbine housing 5T via the bearing-side plate member 14.

In the embodiments shown in FIGS. 3 to 6, the bearing-side plate member 14 is annular in shape. Further, the bearing-side plate member 14 has an outer diameter equal to or slightly smaller than an inner diameter of an opening 30 of the turbine housing 5T on the bearing housing 6 side.

Figure 5:
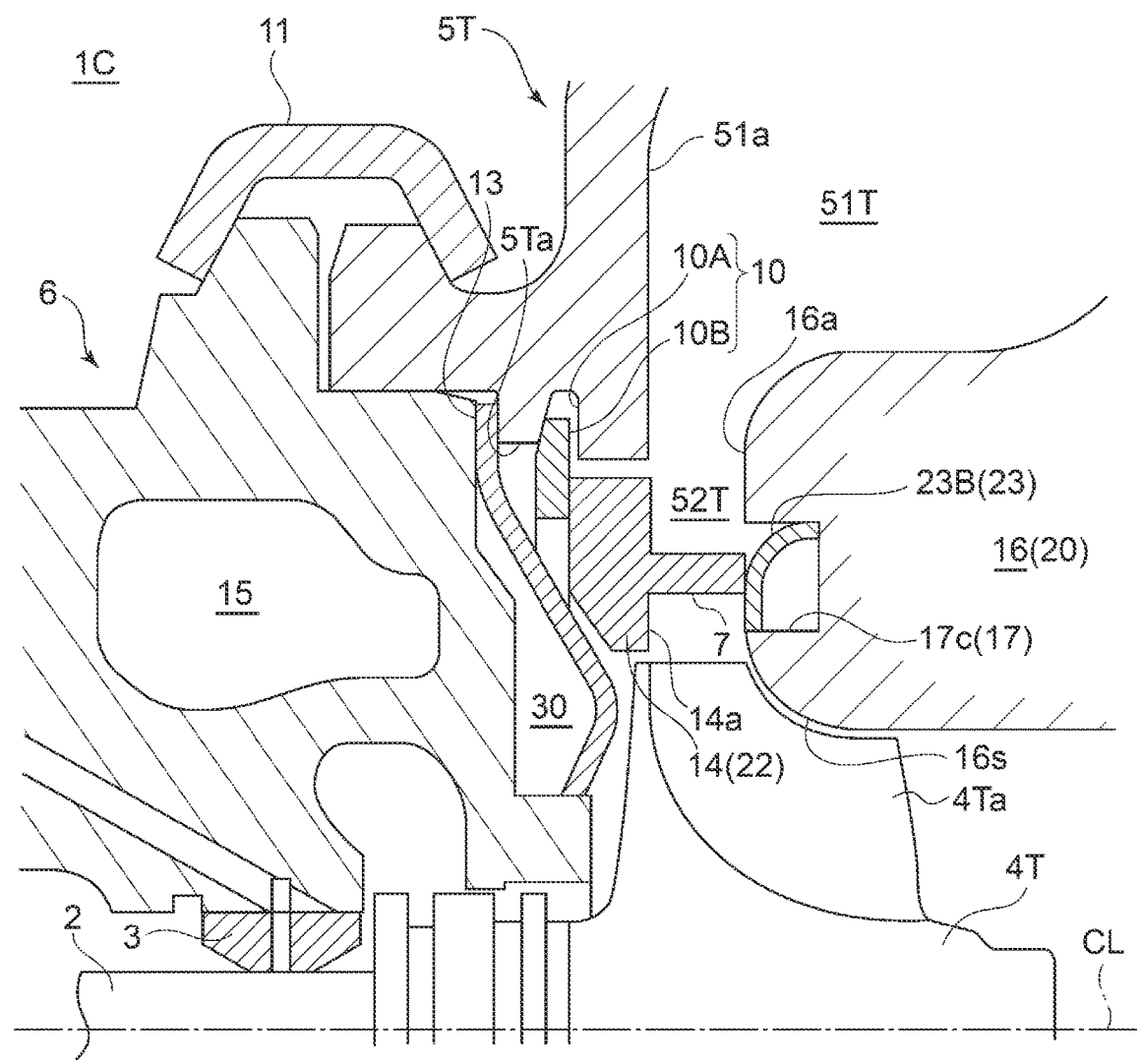
FIG. 5 is a cross-sectional view of a part of a turbocharger according to another embodiment.

In the embodiments shown in FIGS. 3 and 5, the turbine-side radial passage 52T is defined by a radial-passage-side surface 16a of the shroud part 16 (the impeller-housing-side member 20) forming a part of the turbine housing 5T, and a radial-passage-side surface 14a of the bearing-side plate member 14 (the bearing-housing-side member 22). The radial-passage-side surface 14a of the bearing-side plate member 14 is formed so as to be aligned with a bearing-side scroll surface 51a, which is a wall surface defining the turbine-side scroll passage 51T on the bearing housing 6 side, in substantially the same plane.

Figure 4:
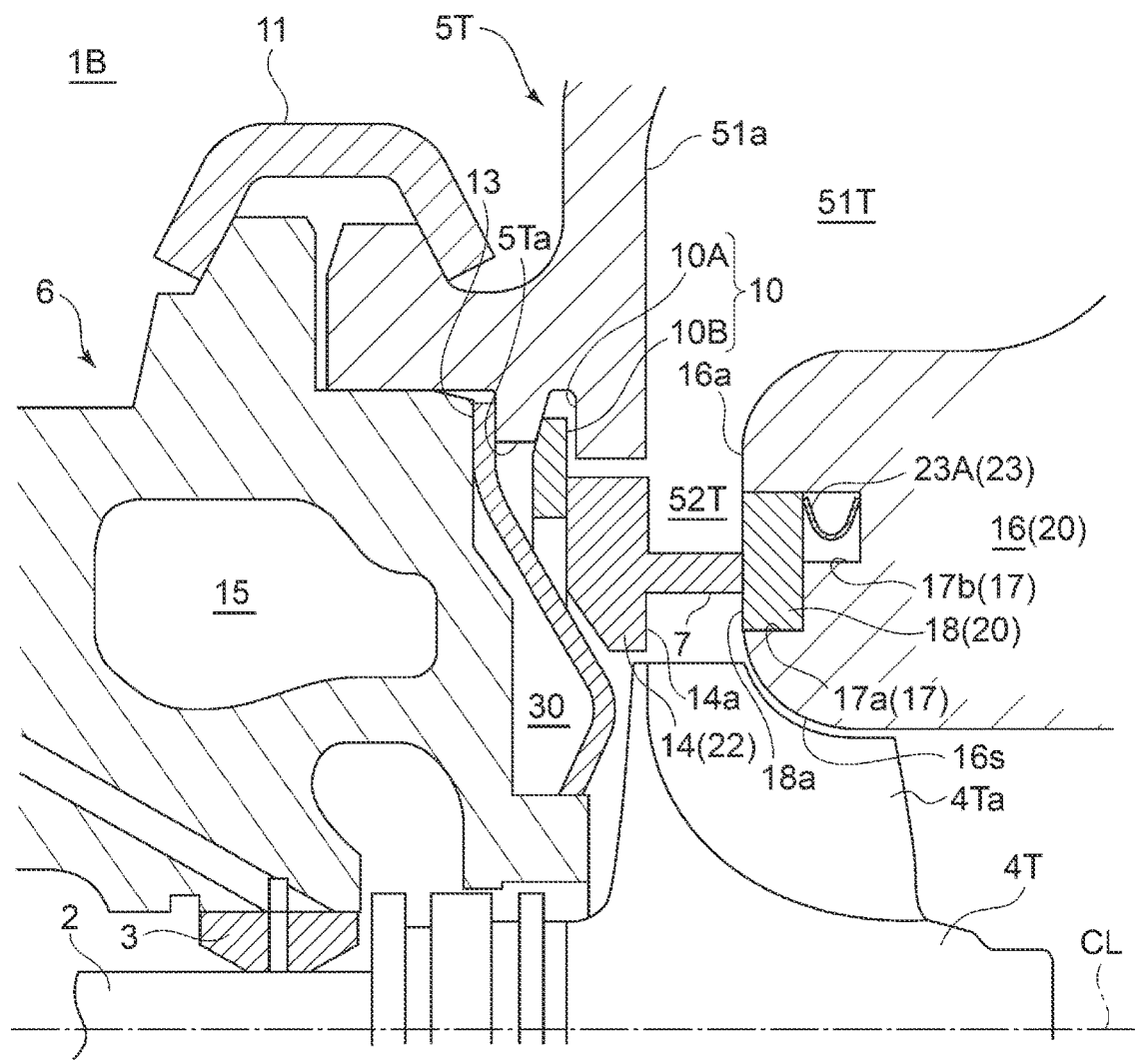
FIG. 4 is a cross-sectional view of a part of a turbocharger according to another embodiment.
Figure 6:
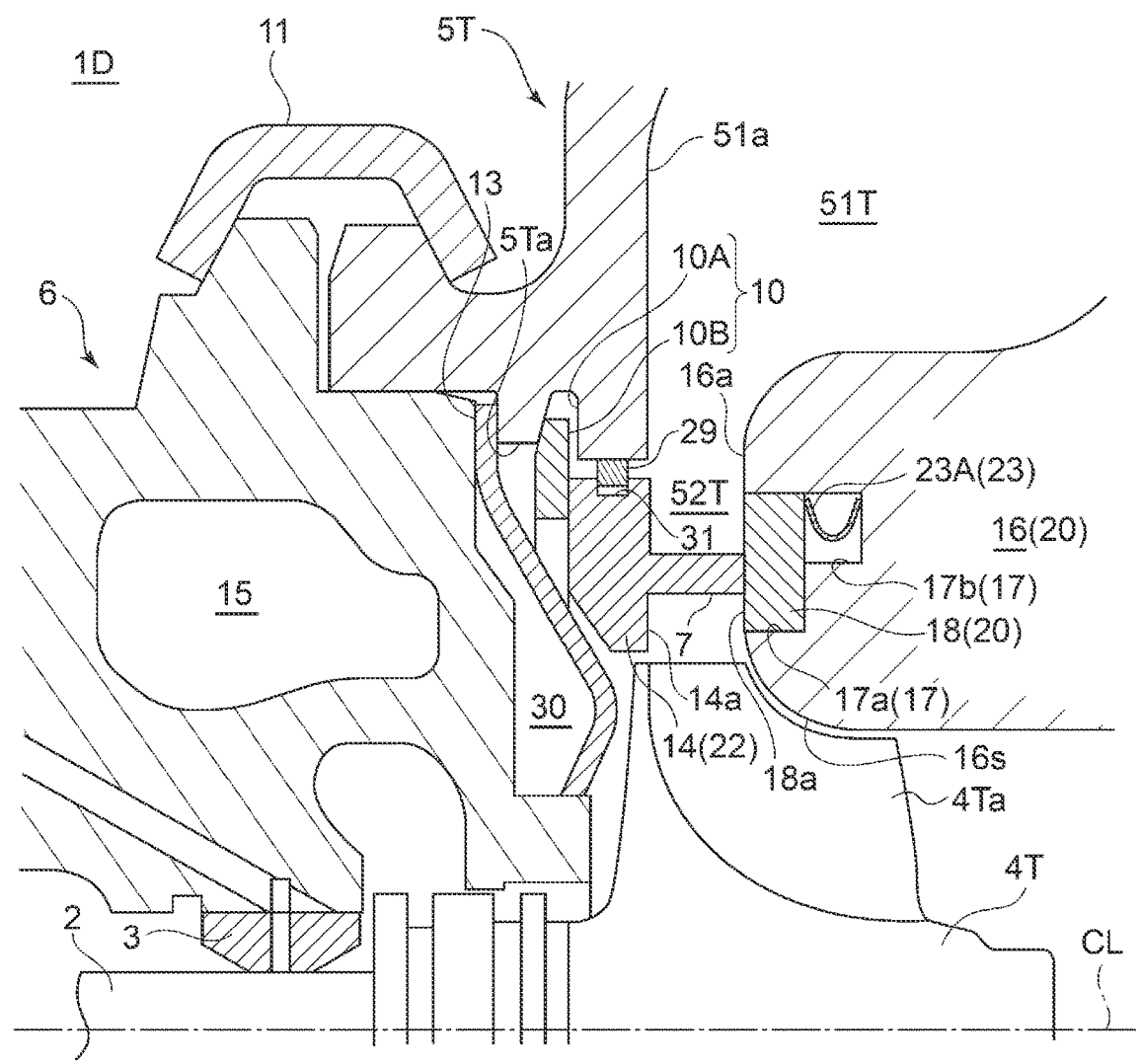
FIG. 6 is a cross-sectional view of a part of a turbocharger according to another embodiment.

In the embodiments shown in FIGS. 4 and 6, the turbine-side radial passage 52T is defined by a radial-passage-side surface 16a of the shroud part 16 (the impeller-housing-side member 20), a shroud-side plate member 18 (the impeller-housing-side member 20) fitted into a recess 17a formed in the radial-passage-side surface 16a, and a radial-passage-side surface 14a of the bearing-side plate member 14 (the bearing-housing-side member 22). The radial-passage-side surface 14a of the bearing-side plate member 14 is formed so as to be aligned with a bearing-side scroll surface 51a, which is a wall surface defining the turbine-side scroll passage 51T on the bearing housing 6 side, in substantially the same plane. Also, the radial-passage-side surface 16a of the shroud part 16 and the radial-passage-side surface 18a of the shroud-side plate member 18 are formed so as to be aligned with each other in substantially the same plane.

Herein, the shroud part 16 is defined as a portion at least including a shroud surface 16s facing a tip edge of a turbine blade 4Ta of the turbine impeller 4T and the above-described radial-passage-side surface 16a contiguous to the shroud surface 16s.

In such embodiments, the bearing-housing-side member 22 is composed of the bearing-side plate member 14 formed separately from the turbine housing 5T and from the bearing housing 6, and the circumferential groove 10A is disposed on the bearing housing 6 side with respect to the bearing-side plate member 14. Thus, when the fitting member 10B is inserted from the opening 30 on the bearing housing 6 side into the turbine housing 5T so that the fitting member 10B is fitted into the circumferential groove 10A, the stationary blade 7 is pressed to the turbine housing 5T via the bearing-side plate member 14.

In some embodiments, as shown in FIGS. 3 to 6, the impeller-housing-side member 20 is composed of the shroud part 16 which is a part of the turbine housing 5T. Further, the fitting member 10B is configured so that an inner peripheral part 10Bb, which is positioned on an inner peripheral side of the outer peripheral part 10Ba, abuts on the bearing-side plate member 14, and the stationary blade 7 is pressed to the shroud part 16 via the bearing-side plate member 14 in a state where the outer peripheral part 10Ba of the fitting member 10B is fitted into the circumferential groove 10A.

In the embodiment shown in FIG. 3, the stationary blade 7 abuts on the radial-passage-side surface 16a of the shroud part 16 and is directly pressed to the shroud part 16. In the embodiment shown in FIG. 4, the stationary blade 7 abuts on the shroud-side plate member 18 fitted into the recess 17a formed in the radial-passage-side surface 16a of the shroud part 16. Thus, the stationary blade 7 is pressed to the shroud part 16 via the shroud-side plate member 18. In the embodiment shown in FIG. 5, the stationary blade 7 abuts on an annular elastic member 23B fitted into a recess 17c formed in the radial-passage-side surface 16a of the shroud part 16. Thus, the stationary blade 7 is pressed to the shroud part 16 via the elastic member 23B.

In such embodiments, the impeller-housing-side member 20 is composed of the shroud part 16 which is a part of the turbine housing 5T. Thus, when the fitting member 10B is inserted from the opening 30 on the bearing housing 6 side into the turbine housing 5T and the fitting member 10B is fitted into the circumferential groove 10A, the inner peripheral part 10Bb of the fitting member 10B abuts on the bearing-side plate member 14. Consequently, the stationary blade 7 can be pressed to the shroud part 16, which is a part of the turbine housing 5T, via the bearing-side plate member 14.

In some embodiments, in the embodiments shown in FIGS. 3 to 6 the stationary blade 7 and the bearing-side plate member 14 are integral with each other. In this case, the stationary blade 7 and the bearing-side plate member 14 may be formed integrally by casting, metal plate welding, or cutting. The stationary blade 7 and the bearing-side plate member 14 may be integrated by welding. The integration process is not limited to a particular method.

In such embodiments, the stationary blade 7 and the bearing-side plate member 14 are prevented from shifting relative to each other when the stationary blade 7 is pressed to the shroud part 16 via the bearing-side plate member 14. Thus, it is possible to stably fix the stationary blade 7 within the turbine housing 5T.

In some embodiments, as shown in FIGS. 4 to 6, the elastic member 23 is mounted into a recess 17 formed in the radial-passage-side surface 16a of the shroud part 16. Further, it is configured so that the elastic force of the elastic member 23 acts on the stationary blade 7.

In the embodiments shown in FIGS. 4 and 6, a further recess (second recess 17b) is formed in the bottom surface of the recess 17a. Into the second recess 17b, an annular elastic member 23A having a U-shaped cross-section is mounted so that an opening of the U-shape is directed to the outer periphery. Further, it is configured so that the elastic force acts on the stationary blade 7 via the shroud-side plate member 18.

In the embodiment shown in FIG. 5, an annular elastic member 23B having an L-shaped (or arc-shaped) cross-section is mounted into the recess 17c so as to face inward. Further, it is configured so that the elastic force directly acts on the stationary blade 7.

In such embodiments, even if the stationary blade 7 thermally expands due to a high-temperature exhaust gas or a compressed air, it is possible to absorb the thermal expansion by the elastic member 23. Accordingly, excessive thermal stress does not occur in the stationary blade 7, and the stationary blade 7 can achieve excellent durability.

In some embodiments, as shown in FIG. 6, a seal groove 31 is formed in an outer peripheral surface 14c (see FIG. 7) of the bearing-side plate member 14. Into the seal groove 31, an annular seal member 29 is mounted.

In the illustrated embodiment, the seal groove 31 is annular in shape and recessed in a cross-section. Although not illustrated, a seal groove may be formed in an inner peripheral surface 5Tc (FIG. 7) of the turbine housing 5T, and the seal member 29 may be mounted into this seal groove.

In such embodiments, it is possible to prevent the leakage of a high-temperature exhaust gas and a compressed air from the butting portion 10B3 (see FIG. 15) of the fitting member 10B toward the bearing housing 6.

Figure 7:
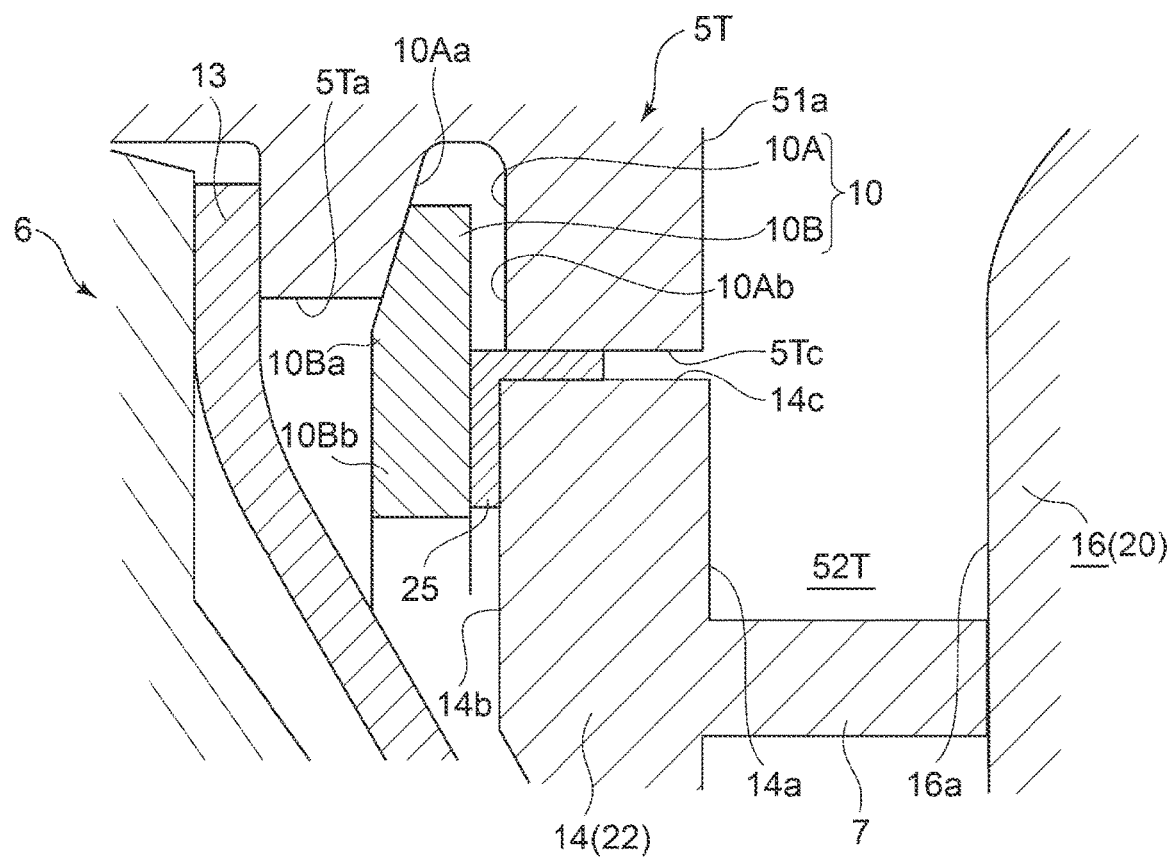
FIG. 7 is an enlarged cross-sectional view of a portion where a fitting member abuts on a bearing-side plate member.
Figure 8:
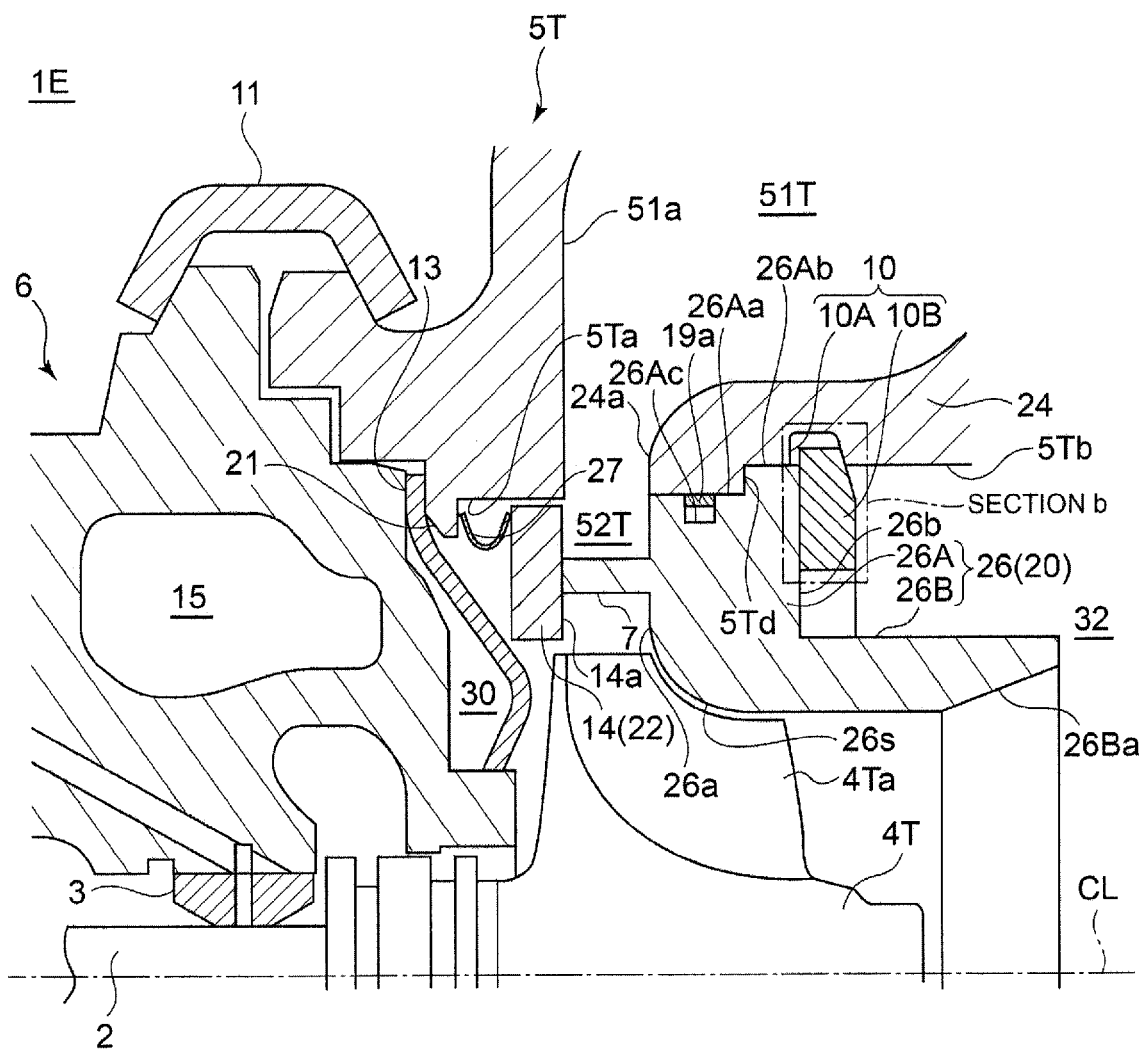
FIG. 8 is a cross-sectional view of a part of a turbocharger according to another embodiment.
Figure 8:
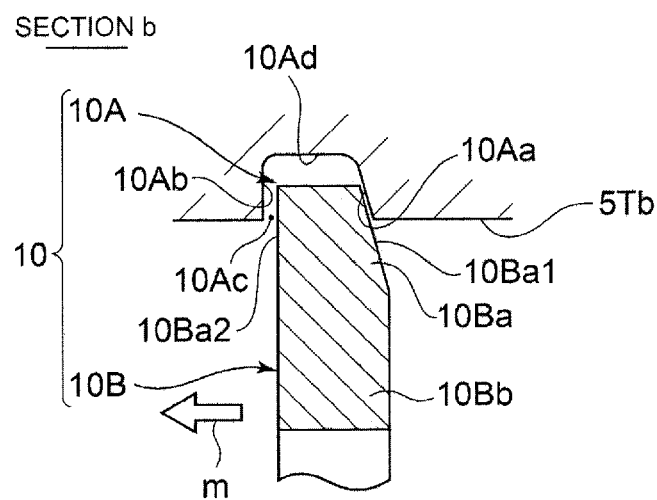

FIG. 7 is an enlarged cross-sectional view of a portion where the fitting member abuts on the bearing-side plate member.

In some embodiments, as shown in FIG. 7, an annular seal member 25 is provided between the fitting member 10B and the bearing-side plate member 14.

In the embodiment shown in FIG. 7, the seal member 25 has a plate-like shape having a reverse L-shaped cross-section in which the L-shape is vertically reversed. In the abutting portion between the fitting member 10B and the bearing-side plate member 14, one branch of the L-shape is interposed between the inner peripheral part 10Bb of the fitting member 10B and the back surface 14b (a surface opposite to the radial-passage-side surface 14a) of the bearing-side plate member 14, and the other branch is interposed between the outer peripheral surface 14c of the bearing-side plate member 14 and the inner peripheral surface 5Tc of the turbine housing 5T.

In such embodiments, it is possible to prevent the leakage of a high-temperature exhaust gas and a compressed air from the butting portion 10B3 (see FIG. 15) of the fitting member 10B toward the bearing housing 6.

In some embodiments, as shown in FIGS. 8 to 14, the turbine housing 5T includes a housing body 24 having therein the turbine-side scroll passage 51T and a shroud member 26 formed separately from the housing body 24 and mounted to an inner peripheral side of the housing body 24. The impeller-housing-side member 20 is composed of the shroud member 26. The circumferential groove 10A is disposed on an opposite side to the bearing housing 6 (a side away from the turbine-side radial passage 52T) with respect to the shroud member 26. The fitting member 10B is configured to press the stationary blade 7 to the turbine housing 5T via the shroud member 26.

In the embodiments shown in FIGS. 8 to 14, the bearing-side plate member 14 is annular in shape. Further, the bearing-side plate member 14 has an outer diameter equal to or slightly smaller than an inner diameter of the opening 30 of the turbine housing 5T on the bearing housing 6 side.

In the embodiments shown in FIGS. 8 to 14, the housing body 24 and the shroud member 26 are annular in shape. An outer diameter of the shroud member 26 is substantially equal to or slightly smaller than an inner diameter of the housing body 24 so that the shroud member 26 can be mounted on an inner peripheral side of the housing body 24. The shroud member 26 has a radial part 26A extending in a radial direction and an axial part 26B extending in a direction of the axis CL. A stepped part 26Ab is formed on an outer peripheral surface 26Aa of the radial part 26A. The stepped part 26Ab is configured to abut on a projection 5Td of the inner peripheral surface 5Tb of the housing body 24, formed on the turbine-side radial passage 52T side. In the outer peripheral surface 26Aa of the radial part 26A, a seal groove 26Ac is disposed at a position closer to the turbine-side radial passage 52T in the axis CL direction than the stepped part 26Ab is. Into this seal groove 26Ac, an annular seal ring 19a is fitted. Further, a diameter-enlarging part 26Ba is formed on an outlet side of the axial part 26B so that the opening is enlarged toward the outlet end.

Figure 14:
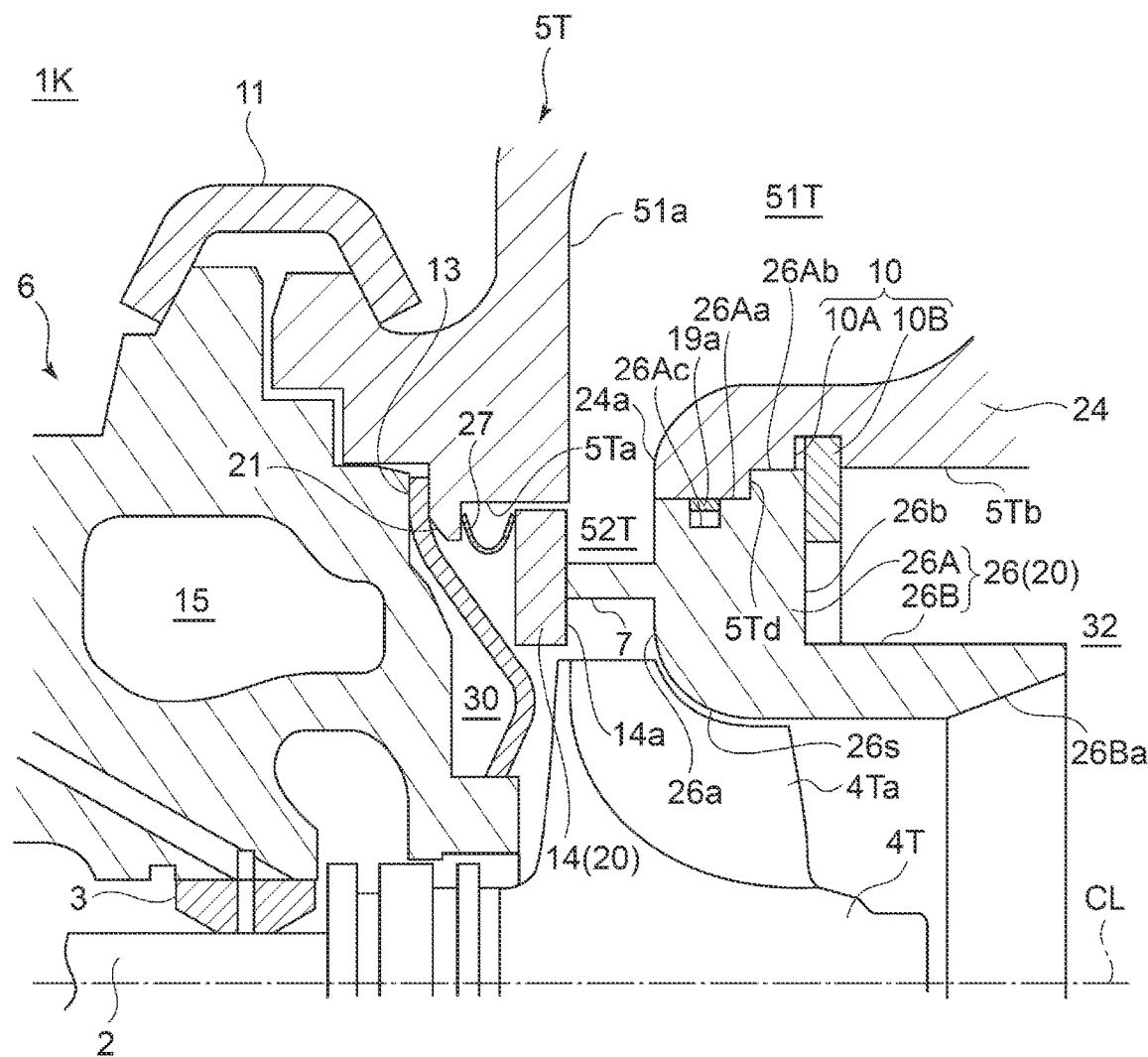
FIG. 14 is a cross-sectional view of a part of a turbocharger according to another embodiment.

In the embodiments shown in FIGS. 8 and 14, the turbine-side radial passage 52T is defined by a radial-passage-side surface 26a of the shroud member 26 (the impeller-housing-side member 20) and a radial-passage-side surface 14a of the bearing-side plate member 14 (the bearing-housing-side member 22). The radial-passage-side surface 14a of the bearing-side plate member 14 is formed so as to be aligned with a bearing-side scroll surface 51a. which is a wall surface defining the turbine-side scroll passage 51T on the bearing housing 6 side, in substantially the same plane. Also, the radial-passage-side surface 16a of the shroud part 16 and the radial-passage-side surface 24a of the housing body 24 are formed so as to be aligned with each other in substantially the same plane. A back surface 26b of the shroud member 26 is configured to abut on the inner peripheral part 10Bb of the fitting member 10B.

Herein, the shroud member 26 is defined as a member at least including a shroud surface 26s facing a tip edge of a turbine blade 4Ta of the turbine impeller 4T and the above-described radial-passage-side surface 26a contiguous to the shroud surface 26s.

In such embodiments, the impeller-housing-side member 20 is composed of the shroud member 26 formed separately from the housing body 24 and mounted to an inner peripheral side of the housing body 24, and the circumferential groove 10A is disposed on an opposite side to the bearing housing 6 with respect to the shroud member 26. Thus, when the fitting member 10B is inserted from an opening 32 (outlet opening) opposite to the opening 30 on the bearing housing 6 side into the turbine housing 5T and the fitting member 10B is fitted into the circumferential groove 10A, the stationary blade 7 is pressed to the turbine housing 5T via the shroud member 26.

Compared with the embodiments shown in FIGS. 3 to 5, these embodiments enable the fitting member 10B to be located at a position where the exhaust gas temperature is low. Thus, the fitting member 10B can be made of a material having low heat resistance, compared with the embodiments shown in FIGS. 3 to 5.

In some embodiments, as shown in FIGS. 8 to 14, the bearing-housing-side member 22 is composed of the bearing-side plate member 14 formed separately from the turbine housing 5T and from the bearing housing 6. A projection 21 projecting from the inner peripheral surface 5Th of the turbine housing 5T is formed on a bearing housing 6 side of the bearing-side plate member 14. Further, the fitting member 10B is configured so that the inner peripheral part 10Bb, which is positioned on an inner peripheral side of the outer peripheral part 10Ba, abuts on the shroud member 26, and the stationary blade 7 is pressed to the projection 21 via the shroud member 26 and the bearing-side plate member 14 in a state where the outer peripheral part 10Ba of the fitting member 10B is fitted into the circumferential groove 10A.

In the embodiments shown in FIGS. 8 to 11 and 14 the bearing-side plate member 14 is pressed to the projection 21 via an annular elastic member 27. In the embodiments shown in FIGS. 12 and 13, the bearing-side plate member 14 abuts on the projection 21 and is directly pressed to the projection 21.

In such embodiments, the bearing-housing-side member 22 is composed of the bearing-side plate member 14 formed separately from the turbine housing 5T and from the bearing housing 6, and the projection 21 projecting from the inner peripheral surface 5Ta of the turbine housing 5T is disposed on the bearing housing 6 side of the bearing-side plate member 14. Thus, when the fitting member 10B is inserted from the opening 32 opposite to the opening 30 on the bearing housing 6 side into the turbine housing 5T so that the fitting member 10B is fitted into the circumferential groove 10A, the inner peripheral part 10Bb of the fitting member 10B abuts on the shroud member 26. Consequently, the stationary blade 7 can be pressed to the projection 21 of the turbine housing 5T via the shroud member 26 and the bearing-side plate member 14.

In some embodiments, as shown in FIGS. 8 and 11 to 14, the stationary blade 7 and the shroud member 26 are integral with each other. In this case, the stationary blade 7 and the shroud member 26 may be formed integrally by casting. The stationary blade 7 and the shroud member 26 may be integrated by welding. The integration process is not limited to a particular method.

In such embodiments, the stationary blade 7 and the shroud member 26 are prevented from shifting relative to each other when the stationary blade 7 is pressed to the projection 21 via the shroud member 26 and the bearing-side plate member 14. Thus, it is possible to stably fix the stationary blade 7 within the turbine housing 5T.

Figure 9:
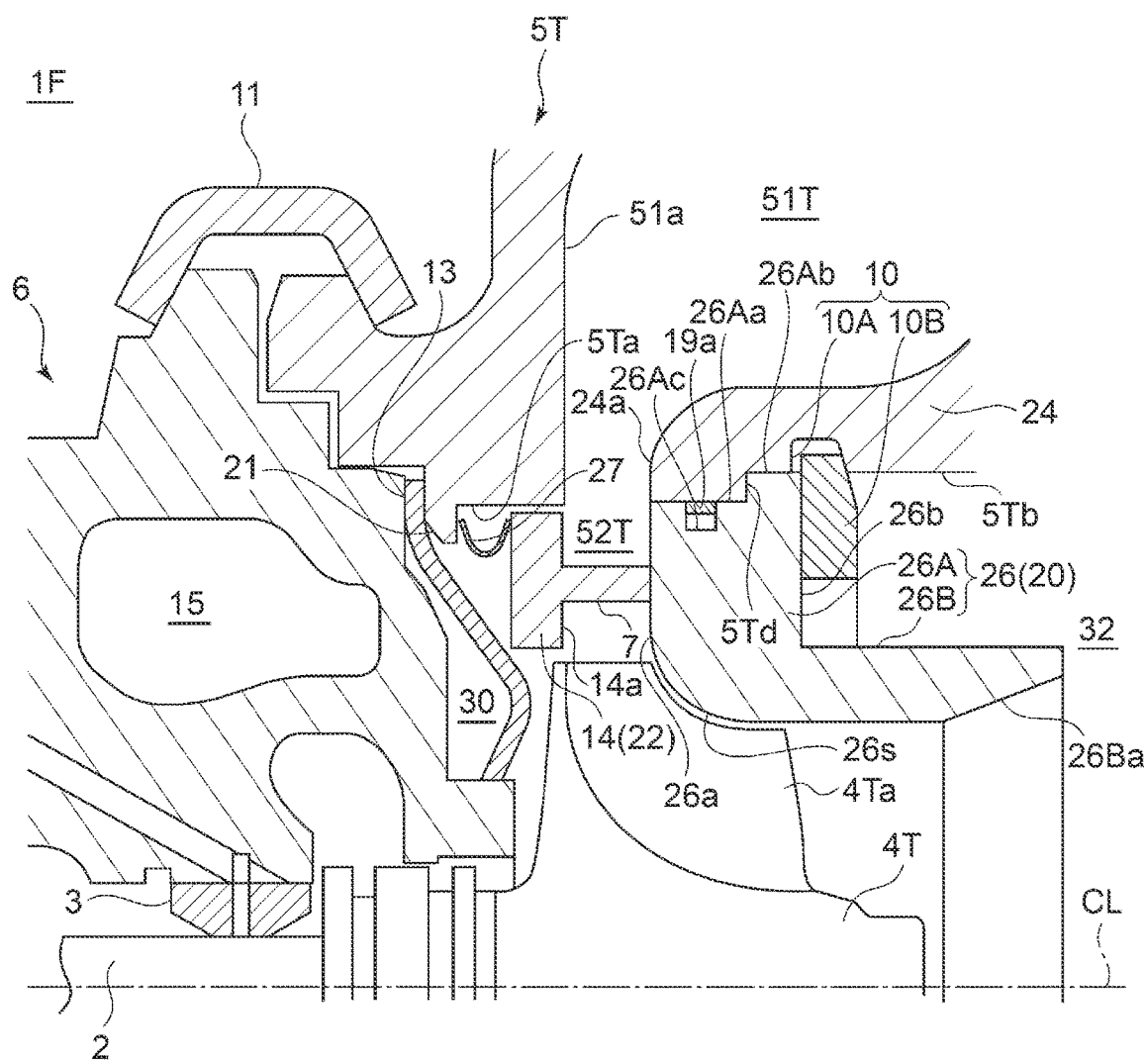
FIG. 9 is a cross-sectional view of a part of a turbocharger according to another embodiment.

In some embodiments, as shown in FIG. 9, the stationary blade 7 and the bearing-side plate member 14 are integral with each other. In this case, the stationary blade 7 and the bearing-side plate member 14 may be formed integrally by casting. The stationary blade 7 and the bearing-side plate member 14 may be integrated by welding. The integration process is not limited to a particular method.

In such embodiments, the stationary blade 7 and the bearing-side plate member 14 are prevented from shifting relative to each other when the stationary blade 7 is pressed to the projection 21 via the shroud member 26 and the bearing-side plate member 14. Thus, it is possible to stably fix the stationary blade 7 within the turbine housing 5T.

Figure 10:
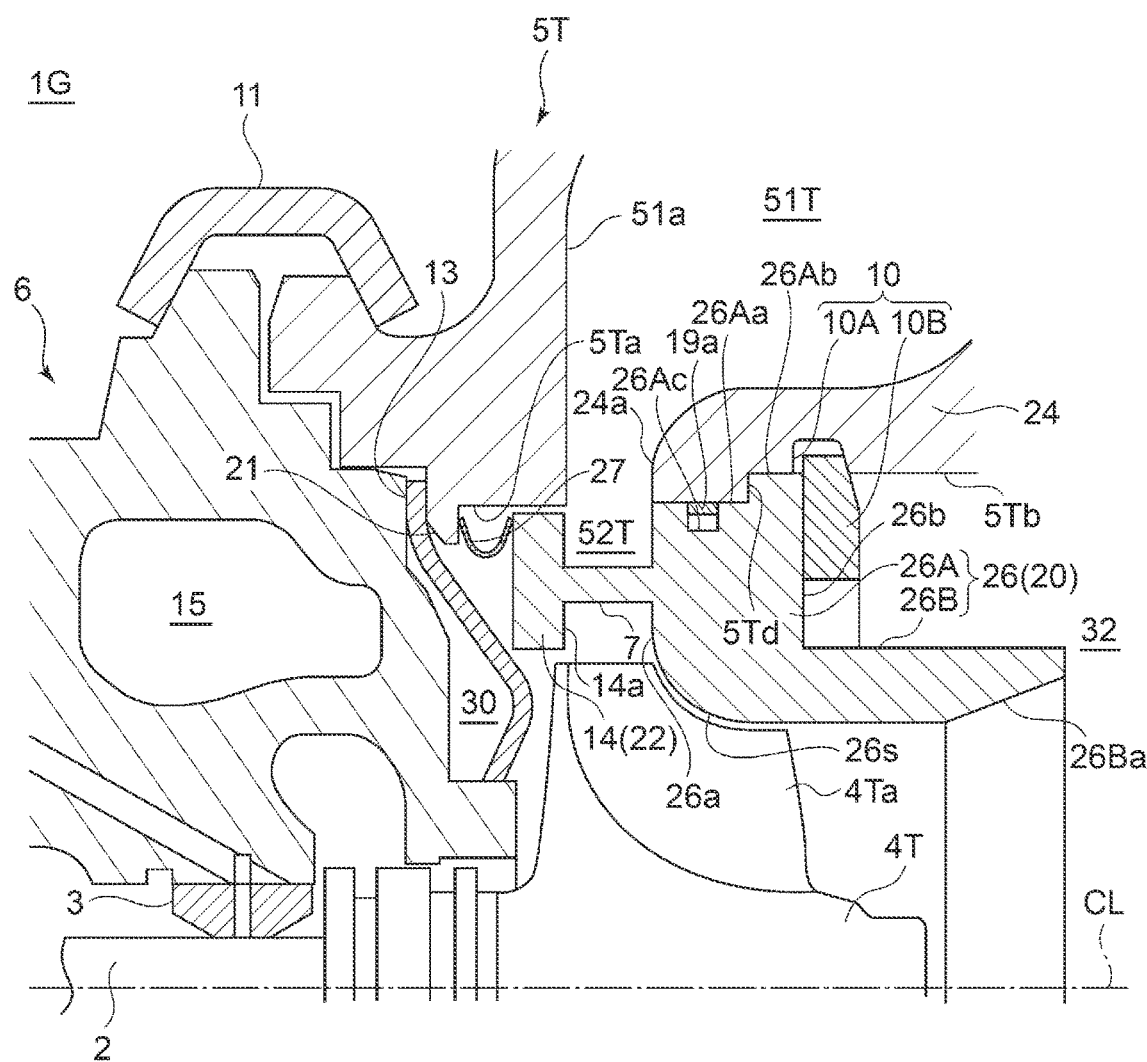
FIG. 10 is a cross-sectional view of a part of a turbocharger according to another embodiment.

In some embodiments, as shown in FIG. 10, the stationary blade 7, the shroud member 26, and the bearing-side plate member 14 are integral with each other. In this case, the stationary blade 7, the shroud member 26, and the bearing-side plate member 14 may be formed integrally by casting. The stationary blade 7, the shroud member 26, and the bearing-side plate member 14 may be integrated by welding. The integration process is not limited to a particular method.

In such embodiments, the stationary blade 7 and the shroud member 26, as well as the stationary blade 7 and the bearing-side plate member 14, are prevented from shifting relative to each other when the stationary blade 7 is pressed to the projection 21 via the shroud member 26 and the bearing-side plate member 14. Thus, it is possible to stably fix the stationary blade 7 within the turbine housing 5T.

In some embodiments, as shown in FIG. 2, the impeller 4 is composed of a turbine impeller 4T configured to rotate by an exhaust gas discharged from an engine (not shown), and the impeller housing 5 is composed of a turbine housing 5T accommodating the turbine impeller 4T. Furthermore, as shown in FIG. 11, a bypass passage 54T which bypasses the turbine impeller 4T and communicates with an upstream portion of the turbine-side scroll passage 51T and a downstream portion of the turbine impeller 4T is provided within the turbine housing 5T. The turbocharger 1G further includes a diffuser member 28 forming a diffuser passage 53T through which the exhaust gas coming from the turbine impeller 4T flows and a waste-gate valve 12, disposed radially outward of the diffuser member 28, for opening and closing the bypass passage 54T. Further, the shroud member 26 and the diffuser member 28 are integral with each other.

In the embodiment shown in FIG. 11, the diffuser member 28 is connected to an outlet end of the axial part 26B of the shroud member 26 and has a funnel shape in which the flow passage area gradually increases downstream in a flow direction of the exhaust gas. The diffuser passage 53T formed downstream of the turbine impeller 4T enables the exhaust gas having passing through the turbine impeller 4T to be smoothly discharged to the outside, thus improving the turbine efficiency.

In such embodiments, the diffuser member 28 can be fixed within the turbine housing 5T by fixing the shroud member 26 within the turbine housing 5T. Thus, excellent assemblability can be achieved.

In some embodiments, as shown in FIGS. 8 to 11 and 14, an elastic member 27 is provided between the projection 21 and the bearing-side plate member 14.

In the illustrated embodiments, an annular elastic member 27 having a U-shaped cross-section is mounted between the projection 21 and the bearing-side plate member 14 so that an opening of the U-shape is directed to the outer periphery. Further, it is configured so that the elastic force acts on the stationary blade 7 via the bearing-side plate member 14.

In such embodiments, even if, for instance, the stationary blade 7 thermally expands due to a high-temperature exhaust gas or a compressed air, it is possible to absorb the thermal expansion by the elastic member 27. Accordingly, excessive thermal stress does not occur in the stationary blade 7, and the stationary blade 7 can achieve excellent durability.

Figure 16A:
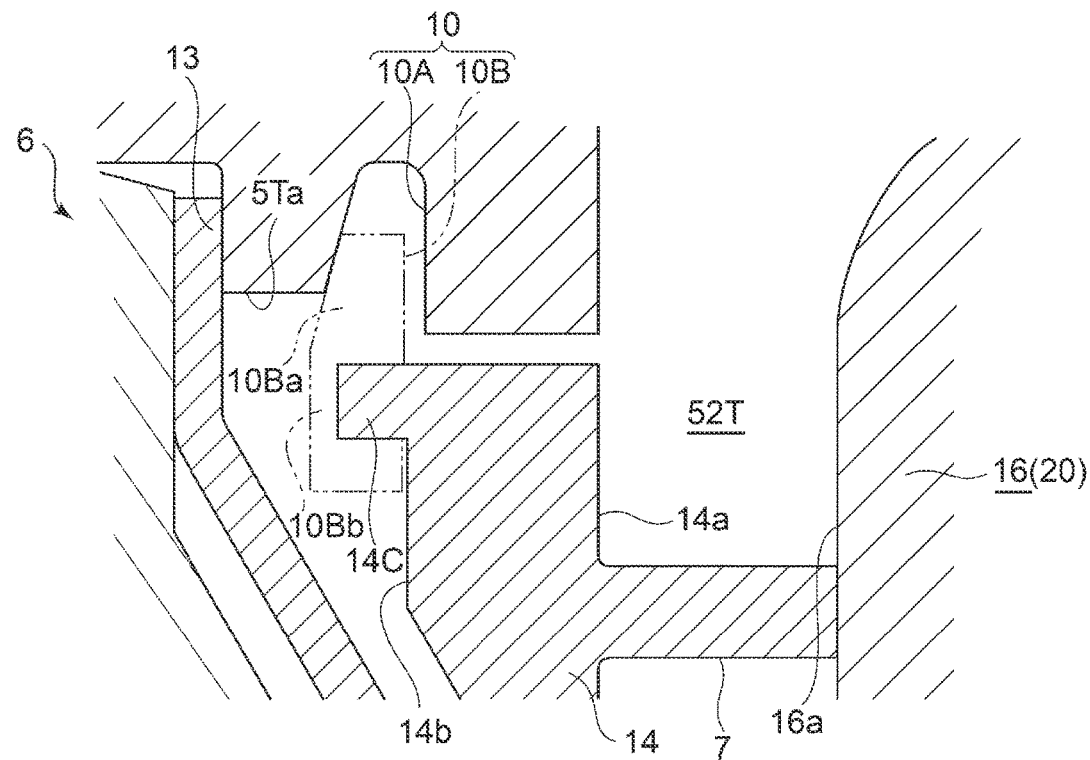
FIG. 16 are diagrams for describing that a projection of a bearing-side plate member is positioned at a butting portion of a fitting member.
Figure 16B:
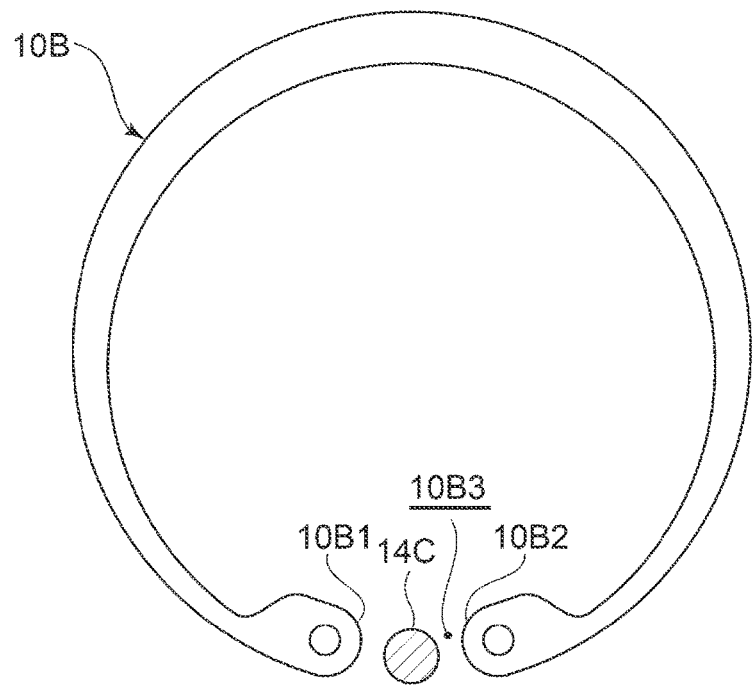

FIG. 16 are diagrams for describing that a projection of the bearing-side plate member is positioned at the butting portion of the fitting member.

In some embodiments, as shown in FIG. 16, a protrusion 14C is formed on a back surface 14b of the bearing-side plate member 14. The fitting member 10B is configured so that the protrusion 14C of the bearing-side plate member 14 is positioned at the butting portion 10B3 of the fitting member 10B while being fitted into the circumferential groove 10A.

According to this embodiment, when the fitting member 10B is rotated in the circumferential groove 10A, the first end 10B1 and the second end 10B2 of the fitting member 10B abut on the protrusion 14C of the bearing-side plate member 14. Thus, it is possible to prevent rotation of the fitting member 10B fitted into the circumferential groove 10A.

Figure 17A:
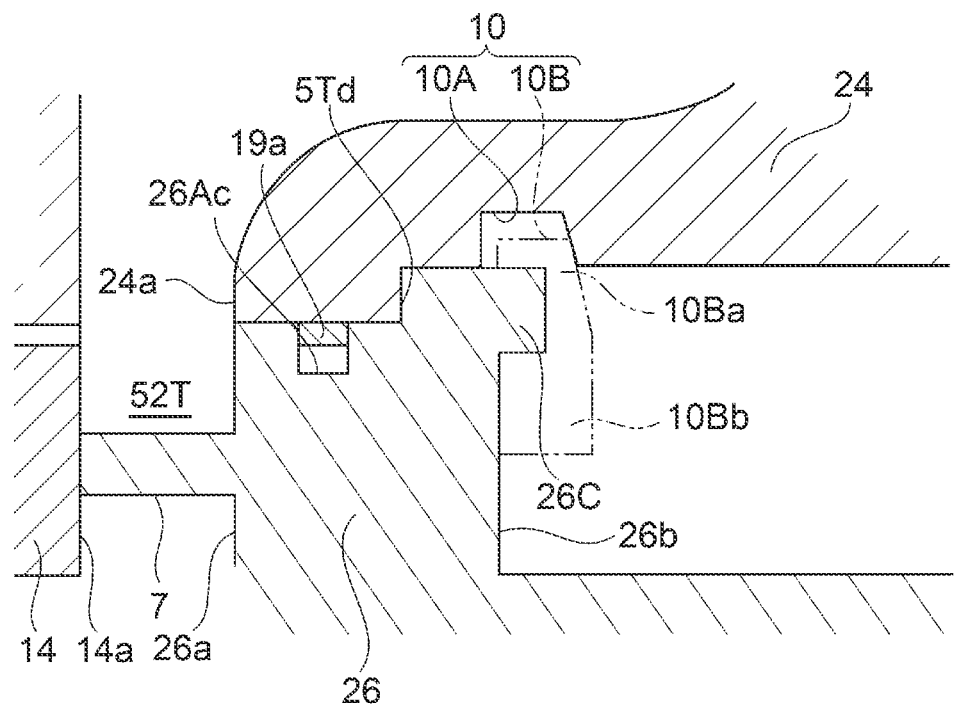
FIG. 17 are diagrams for describing that a projection of a shroud member is positioned at a butting portion of a fitting member.
Figure 17B:
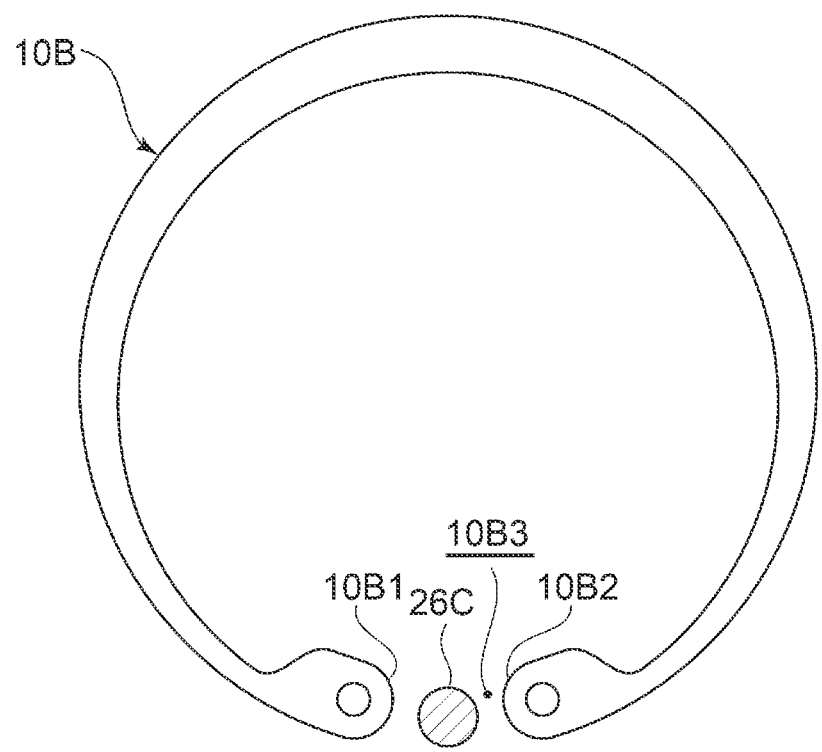

FIG. 17 are diagrams for describing that a projection of the shroud member is positioned at the butting portion of the fitting member.

In some embodiments, as shown in FIG. 17, a protrusion 26C is formed on a back surface 26b of the shroud member 26. The fitting member 10B is configured so that the protrusion 26C of the shroud member 26 is positioned at the butting portion 10B3 of the fitting member 10B while being fitted into the circumferential groove 10A.

According to this embodiment, when the fitting member 10B is rotated in the circumferential groove 10A, the first end 10B1 and the second end of the fitting member 10B abut on the protrusion 26C of the shroud member 26. Thus, it is possible to prevent rotation of the fitting member 10B fitted into the circumferential groove 10A.

Figure 13:
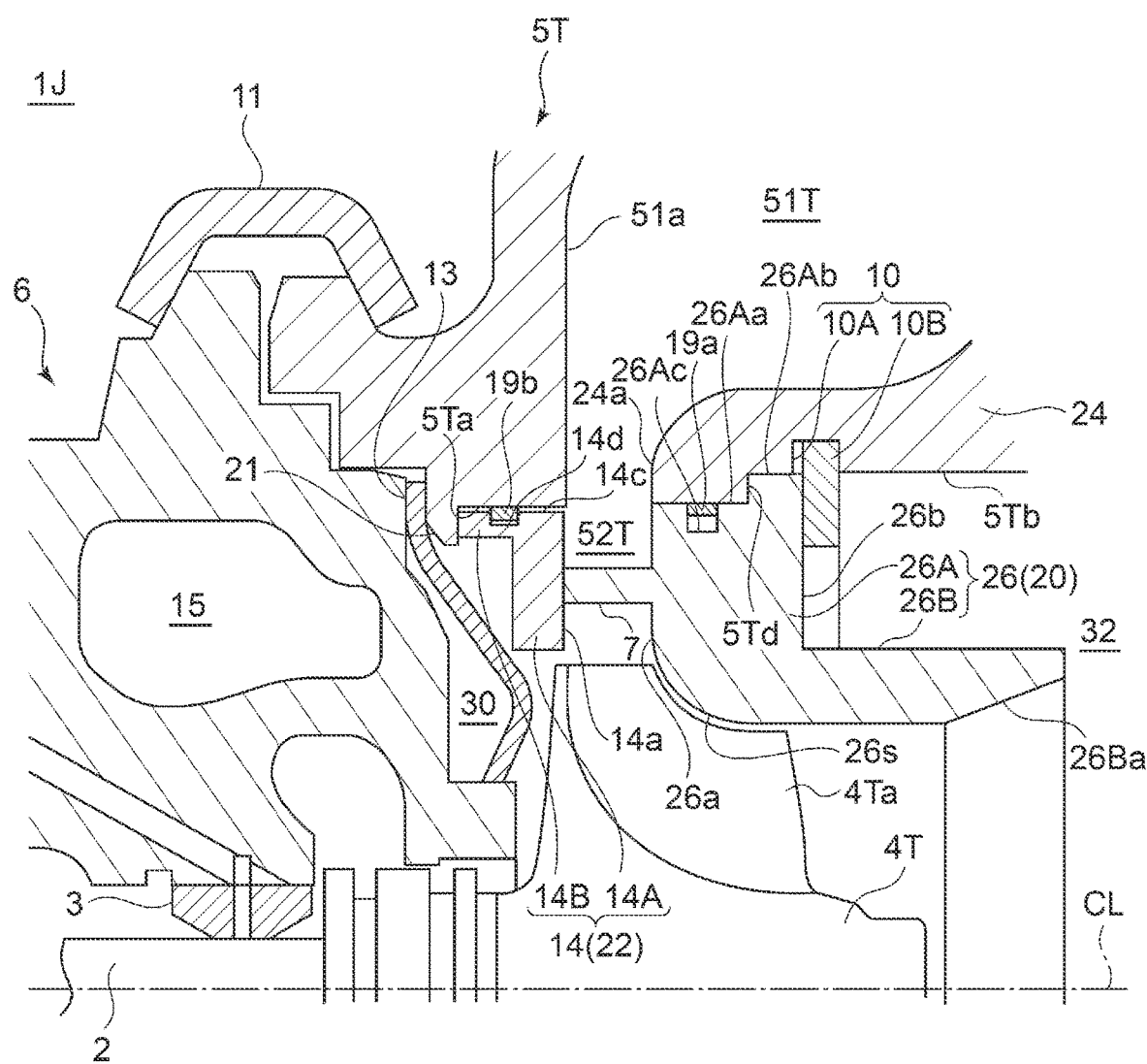
FIG. 13 is a cross-sectional view of a part of a turbocharger according to another embodiment.

In some embodiments, as shown in FIGS. 12 to 14, one of side surfaces of the circumferential groove 10A, namely, a side surface 10Aa farther away from the turbine-side radial passage 52T extends in a direction substantially orthogonal to the axis CL from an opening 10Ac to a bottom surface 10Ad of the circumferential groove 10A. Further, the outer peripheral part 10Ba of the fitting member 10B fitted into the circumferential groove 10A is shaped into a wedge. That is, unlike the embodiments shown in FIGS. 3 to 5 and FIGS. 8 to 11, when the fitting member 10B is fitted into the circumferential groove 10A, even though the fitting member 10B expands in a radial direction, a force to move the fitting member 10B toward the turbine-side radial passage 52T does not act.

Even in such embodiments, when the fitting member 10B is fitted into the circumferential groove 10A while the fitting member 10B is pressed to the shroud member 26 (or the bearing-side plate member 14 in the embodiments corresponding to FIGS. 3 to 5), the stationary blade 7 can be pressed to the turbine housing 5T by a diameter expansion force (a force for expansion in radical direction) of the fitting, member 10B and thereby fixed within the housing.

In some embodiments, as shown in FIGS. 12 and 13, the bearing-side plate member 14 has a radial plate part 14A extending in a radial direction and an axial plate part 14B extending in a direction of the axis CL. The axial plate part 14B extends from an outer peripheral part of the radial plate part 14A toward an opposite side to the turbine-side radial passage 52T. The distal end of the axial plate part 14B abuts on the projection 21. That is, unlike the above-described embodiments shown in FIGS. 8 to 11 and 14, the elastic member 27 is not provided between the projection 21 and the bearing-side plate member 14, and the bearing-side plate member 14 directly abuts on the projection 21.

In the embodiment shown in FIG. 13, a seal groove 14d is formed in an outer peripheral surface 14c of the axial plate part 14B. Into the seal groove 14d, an annular seal ring 19b is fitted.

Even in such embodiments, as described above, when the fitting member 10B is fitted into the circumferential groove 10A while the fitting member 10B is pressed to the shroud member 26 (or the bearing-side plate member 14 in the embodiments corresponding to FIGS. 3 to 6), the stationary blade 7 can be pressed to the turbine housing 5T by a diameter expansion force (a force for expansion in radical direction) of the fitting member 10B and thereby fixed within the housing.

According to an embodiment of the present invention, there is provided a method for assembling a turbocharger 1a, as shown in FIGS. 1 to 6, including: a rotational shaft 2; a turbine impeller 4T mounted to the rotational shaft 2; an impeller housing 5T accommodating the turbine impeller 4T and having therein a turbine-side scroll passage 51T formed on an outer peripheral side of the turbine impeller 4T; a bearing housing 6 accommodating a bearing 3 which rotatably supports the rotational shaft 2 and connected to the turbine housing 5T in a direction of an axis CL of the rotational shaft 2; a stationary blade 7 disposed in a turbine-side radial passage 52T formed between the turbine-side scroll passage 51T and the turbine impeller 4T, the turbine-side radial passage 52T being defined by an impeller-housing-side member 20 and a hearing-housing-side member 22 which face each other in the direction of the axis CL of the rotational shaft 2; and a fixation unit 10 pressing and thereby fixing the stationary blade 7 to the turbine housing 5T.

The fixation unit 10 includes an annular circumferential groove 10A formed in an inner peripheral surface 5Ta of the turbine housing 5T and a ring-shaped fitting member 10B subjected to a force for expanding in a radial direction acts while being fitted into the circumferential groove 10A. The fitting member 10B is configured to press the stationary blade 7 to the turbine housing 5T via at least one of the impeller-housing-side member 20 or the bearing-housing-side member 22.

The bearing-housing-side member 22 is composed of the bearing-side plate member 22 formed separately from the turbine housing 5T and from the bearing housing 6, and the circumferential groove 10A is disposed on a bearing housing 6 side with respect to the bearing-side plate member 22.

The method for assembling the turbocharger 1a includes an inserting step of inserting the bearing-side plate member 14 into the turbine housing 5T from an opening 30 of the turbine housing 5T on a bearing housing 6 side and a fitting step of inserting the fitting member 10B into the turbine housing 5T from the opening 30 and fitting the fitting member 10B into the circumferential groove 10A.

In this embodiment, the fitting member 10B is inserted from the opening 30 on the bearing housing 6 side into the turbine housing 5T, and the fitting member 10B is fitted into the circumferential groove 10A. Thus, the stationary blade 7 can be pressed and fixed to the turbine housing 5T via the bearing-side plate member 14.

Further, according to an embodiment of the present invention, there is provided a method for assembling a turbocharger 1a, as shown in FIGS. 1, 2 and 8 to 14, including: a rotational shaft 2; a turbine impeller 4T mounted to the rotational shaft 2; an impeller housing 5T accommodating the turbine impeller 4T and having therein a turbine-side scroll passage 51T formed on an outer peripheral side of the turbine impeller 4T; a bearing housing 6 accommodating a bearing 3 which rotatably supports the rotational shaft 2 and connected to the turbine housing 5T in a direction of an axis CL of the rotational shaft 2; a stationary blade 7 disposed in a turbine-side radial passage 52T formed between the turbine-side scroll passage 51T and the turbine impeller 4T, the turbine-side radial passage 52T being defined by an impeller-housing-side member 20 and a bearing-housing-side member 22 which face each other in the direction of the axis CL of the rotational shaft 2; and a fixation unit 10 pressing and thereby fixing the stationary blade 7 to the turbine housing 5T.

The fixation unit 10 includes an annular circumferential groove 10A formed in an inner peripheral surface 5Ta of the turbine housing 5T and a ring-shaped fitting member 10B subjected to a force for expanding in a radial direction while being fitted into the circumferential groove 10A. The fitting member 10B is configured to press the stationary blade 7 to the turbine housing 5T via at least one of the impeller-housing-side member 20 or the bearing-housing-side member 22.

The turbine housing 5T includes a housing body 24 having therein the turbine-side scroll passage 51T, and a shroud member 26 formed separately from the housing body 24 and mounted to an inner peripheral side of the housing body 24. The turbine-housing-side member 20 is composed of the shroud member 26, and the circumferential groove 10A is disposed on an opposite side to the bearing housing 6 with respect to the shroud member 26.

The method for assembling the turbocharger 1a includes an inserting step of inserting the shroud member 26 into the turbine housing 5T from an opening 32 opposite to the opening 30 on the bearing housing 6 side of the turbine housing 5T and a fitting step of inserting the fitting member 10B into the turbine housing 5T from the opening 32 and fitting the fitting member 10B into the circumferential groove 10A.

In this embodiment, the fitting member 10B is inserted from the opening 32 opposite to the opening on the bearing housing 6 side into the turbine housing 5T, and the fitting member 10B is fitted into the circumferential groove 10A. Thus, the stationary blade 7 can be pressed and fixed to the turbine housing 5T via the shroud member 26.

The embodiments of the present invention have been described above. However, the present invention is not limited thereto, and various modifications may be applied as long as they do not depart from the object of the present invention.

REFERENCE SIGNS LIST

1 Stationary-blade-type rotating machine
1a Turbocharger
1b Electric compressor
1A to 1K (Turbine-side portion of) Turbocharger
2 Rotational shaft
3 Bearing
4 Impeller
4C Compressor impeller
4T Turbine impeller
4Ta Turbine blade
5 Impeller housing
5C Compressor housing
5T Turbine housing
5Ta, 5Tb, 5Tc Inner peripheral surface of turbine housing
5Td Projection
6 Bearing housing
7 Stationary blade
8 Electric motor
8a Rotor
8b Stator
9 Motor housing
10 Fixation unit
10A Circumferential groove
10Aa Side surface of circumferential groove (further away from radial passage)
10Ab Side surface of circumferential groove (closer to radial passage)
10Ac Opening of circumferential groove
10Ad Bottom surface of circumferential groove
10B Fitting member
10B1 First end
10B2 Second end
10B3 Butting portion
10B4 Ring portion
10Ba Outer peripheral part
10Bb Inner peripheral part
11 Fastening ring
12 Waste-gate valve
13 Back plate
14 Bearing-side plate member
14a Radial-passage-side surface
14b Back surface
14c Outer peripheral surface
14d Seal groove
14A Radial plate part
14B Axial plate part
14C Protrusion
16 Shroud part
16a Radial-passage-side surface
16s Shroud surface
17, 17a to 17c Recess
18 Shroud-side plate member
18a Radial-passage-side surface
19a, 19b Seal ring
20 Impeller-housing-side member
21 Projection
22 Bearing-housing-side member
23, 23A, 23B Elastic member
24 Housing body
24a Radial-passage-side surface
25 Seal member
26 Shroud member
26a Radial-passage-side surface
26b Back surface
26s Shroud surface
26A Radial part
26Aa Outer peripheral surface
26Ab Stepped part
26Ac Seal groove
26B Axial part
26Ba Diameter-enlarging part
26C Protrusion
27 Elastic member
28 Diffuser member
29 Seal member
30 Opening (bearing housing side)
31 Seal groove
32 Opening (outlet side)
51 Scroll passage
51C Compressor-side scroll passage
51T Turbine-side scroll passage
51a Bearing-side scroll surface
52 Radial passage
52C Compressor-side radial passage
52T Turbine-side radial passage
53T Diffuser passage
54T Bypass passage
55T Outlet passage

The invention claimed is:

1. A stationary-blade-type rotating machine comprising:
a rotational shaft;
an impeller mounted to the rotational shaft;
an impeller housing accommodating the impeller and having therein a scroll passage formed on an outer peripheral side of the impeller;
a bearing housing accommodating a bearing which rotatably supports the rotational shaft and connected to the impeller housing in an axial direction of the rotational shaft;
a stationary blade disposed in a radial passage formed between the scroll passage and the impeller, the radial passage being defined by an impeller-housing-side member and a bearing-housing-side member which face each other in the axial direction of the rotational shaft; and
a fixation unit pressing and thereby fixing the stationary blade to the impeller housing,
wherein the fixation unit includes:
an annular circumferential groove disposed in an inner peripheral surface of the impeller housing; and a ring-shaped fitting member subjected to a force to expand in a radial direction while being fitted into the circumferential groove by being fitted into the circumferential groove in a stage where an outer diameter of the fitting member is decreased, the fitting member being configured to press the stationary blade to the impeller housing via at least one of the impeller-housing-side member or the bearing-housing-side member, wherein the bearing-housing-side member is composed of a bearing-side plate member formed separately from the impeller housing and from the bearing housing, wherein the circumferential groove is disposed on a bearing housing side with respect to the bearing-side plate member, and wherein the fitting member is configured to press the stationary blade to the impeller housing via the bearing-side plate member.

2. The stationary-blade-type rotating machine according to claim 1, wherein one of side surfaces, which is farther away from the radial passage, of the circumferential groove is inclined toward the radial passage from an opening to a bottom surface of the circumferential groove, and wherein an outer peripheral part, fitted into the circumferential groove, of the fitting member is shaped into a wedge.

3. The stationary-blade-type rotating machine according to claim 1, wherein the impeller-housing-side member is composed of a shroud part which is a part of the impeller housing, and wherein the fitting member is configured so that an inner peripheral part located on an inner peripheral side of an outer peripheral part of the fitting member abuts on the bearing-side plate member, and the stationary blade is pressed to the shroud part via the bearing-side plate member, in a state where the outer peripheral part of the fitting member is fitted into the circumferential groove.

4. The stationary-blade-type rotating machine according to claim 3, wherein the stationary blade and the bearing-side plate member are integrally formed.

5. The stationary-blade-type rotating machine according to claim 3, wherein an elastic member is mounted into a recess formed in a radial-passage-side surface of the shroud part, and wherein an elastic force of the elastic member acts on the stationary blade.

6. The stationary-blade-type rotating machine according to claim 1, wherein an annular seal member is provided between the fitting member and the bearing-side plate member.

7. The stationary-blade-type rotating machine according to claim 1, wherein the fitting member has a butting portion including a first end and a second end which face each other, wherein a protrusion is formed in a back surface of the bearing-side plate member, and wherein the fitting member is configured so that the protrusion of the bearing-side plate member is positioned at the butting portion of the fitting member in a state where the fitting member is fitted into the circumferential groove.

8. A stationary-blade-type rotating machine comprising:
a rotational shaft;
an impeller mounted to the rotational shaft;
an impeller housing accommodating the impeller and having therein a scroll passage formed on an outer peripheral side of the impeller;
a bearing housing accommodating a bearing which rotatably supports the rotational shaft and connected to the impeller housing in an axial direction of the rotational shaft;
a stationary blade disposed in a radial passage formed between the scroll passage and the impeller, the radial passage being defined by an impeller-housing-side member and a bearing-housing-side member which face each other in the axial direction of the rotational shaft; and
a fixation unit pressing and thereby fixing the stationary blade to the impeller housing,
wherein the fixation unit includes;
an annular circumferential groove disposed in an inner peripheral surface of the impeller housing; and
a ring-shaped fitting member subjected to a force to expand in a radial direction while being fitted into the circumferential groove by being fitted into the circumferential groove in a stage where an outer diameter of the fitting member is decreased, the fitting member being configured to press the stationary blade to the impeller housing via at least one of the impeller-housing-side member or the bearing-housing-side member,
wherein the impeller housing includes: a housing body having therein the scroll passage; and a shroud member formed separately from the housing body and mounted to an inner peripheral side of the housing body,
wherein the impeller-housing-side member is composed of the shroud member,
wherein the circumferential groove is disposed on an opposite side to the bearing housing with respect to the shroud member, and
wherein the fitting member is configured to press the stationary blade to the impeller housing via the shroud member.

9. The stationary-blade-type rotating machine according to claim 8,
wherein the bearing-housing-side member is composed of a bearing-side plate member formed separately from the impeller housing and from the bearing housing,
wherein a projection projecting from an inner peripheral surface of the impeller housing is formed on a bearing housing side with respect to the bearing-side plate member, and
wherein the fitting member is configured so that an inner peripheral part located on an inner peripheral side of an outer peripheral part of the fitting member abuts on the shroud member, and the stationary blade is pressed to the projection via the shroud member and the bearing-side plate member, in a state where the outer peripheral part of the fitting member is fitted into the circumferential groove.

10. The stationary-blade-type rotating machine according to claim 9,
wherein the stationary blade and the shroud member are integrally formed.

11. The stationary-blade-type rotating machine according to claim 9,
wherein the stationary blade and the bearing-side plate member are integrally formed.

12. The stationary-blade-type rotating machine according to claim 9, wherein the stationary blade, the shroud member, and the bearing-side plate member are integrally formed.

13. The stationary-blade-type rotating machine according to claim 9,
wherein the impeller is composed of a turbine impeller configured to rotate by an exhaust gas discharged from an engine,
wherein the impeller housing is composed of a turbine housing accommodating the turbine impeller,
wherein the turbine housing has therein a bypass passage bypassing the turbine impeller and communicating with an upstream side of the scroll passage and a downstream side of the turbine impeller,
wherein the stationary-blade-type rotating machine further comprises:
a diffuser member forming a diffuser passage through which the exhaust gas flowing from the turbine impeller flows; and
a waste-gate valve, disposed radially outward of the diffuser member, for opening and closing the bypass passage, and
wherein the shroud member and the diffuser member are integrally formed.

14. The stationary-blade-type rotating machine according to claim 9,
wherein an elastic member is provided between the projection and the bearing-side plate member.

15. The stationary-blade-type rotating machine according to claim 8,
wherein the fitting member has a butting portion including a first end and a second end which face each other,
wherein a protrusion is formed in a back surface of the shroud member, and
wherein the fitting member is configured so that the protrusion of the shroud member is positioned at the butting portion of the fitting member in a state where the fitting member is fitted into the circumferential groove.

16. A method for assembling a stationary-blade-type rotating machine,
the stationary-blade-type rotating machine including:
a rotational shaft;
an impeller mounted to the rotational shaft;
an impeller housing accommodating the impeller and having therein a scroll passage formed on an outer peripheral side of the impeller;
a bearing housing accommodating a bearing which rotatably supports the rotational shaft and connected to the impeller housing in an axial direction of the rotational shaft;
a stationary blade disposed in a radial passage formed between the scroll passage and the impeller, the radial passage being defined by an impeller-housing-side member and a bearing-housing-side member which face each other in the axial direction of the rotational shaft; and
a fixation unit pressing and thereby fixing the stationary blade to the impeller housing, the fixation unit including an annular circumferential groove and a ring-shaped fitting member, the circumferential groove being disposed in an inner peripheral surface of the impeller housing, the fitting member being subjected to a force to expand in a radial direction while being fitted into the circumferential groove by being fitted into the circumferential groove in a state where an outer diameter of the fitting member is decreased, the fitting member being configured to press the stationary blade to the impeller housing via at least one of the impeller-housing-side member or the bearing-housing-side member,
the bearing-housing-side member being composed of a bearing-side plate member formed separately from the impeller housing and from the bearing housing,
the circumferential groove being disposed on a bearing housing side with respect to the bearing-side plate member,
the method comprising:
an inserting step of inserting the bearing-side plate member from an opening on a bearing housing side of the impeller housing into the impeller housing; and
a fitting step of inserting the fitting member from the opening into the impeller housing and fitting the fitting member into the circumferential groove.

17. A method for assembling a stationary-blade-type rotating machine,
the stationary-blade-type rotating machine including:
a rotational shaft;
an impeller mounted to the rotational shaft;
an impeller housing accommodating the impeller and having therein a scroll passage formed on an outer peripheral side of the impeller;
a bearing housing accommodating a bearing which rotatably supports the rotational shaft and connected to the impeller housing in an axial direction of the rotational shaft;
a stationary blade disposed in a radial passage formed between the scroll passage and the impeller, the radial passage being defined by an impeller-housing-side member and a bearing-housing-side member which face each other in the axial direction of the rotational shaft; and
a fixation unit pressing and thereby fixing the stationary blade to the impeller housing, the fixation unit including an annular circumferential groove and a ring-shaped fitting member, the circumferential groove being disposed in an inner peripheral surface of the impeller housing, the fitting member being subjected to a force to expand in a radial direction while being fitted into the circumferential groove by being fitted into the circumferential groove in a state where an outer diameter of the fitting member is decreased, the fitting member being configured to press the stationary blade to the impeller housing via at least one of the impeller-housing-side member or the bearing-housing-side member,
the impeller housing being composed of a housing body having therein the scroll passage and a shroud member formed separately from the housing body, the shroud member being mounted to an inner peripheral side of the housing body,
the impeller-housing-side member being composed of the shroud member,
the circumferential groove being disposed on an opposite side to the bearing housing with respect to the shroud member,
the method comprising:
an inserting step of inserting the shroud member from an opening opposite to a bearing-housing-side opening of the impeller housing into the impeller housing; and a fitting step of inserting the fitting member from the opening into the impeller housing and fitting the fitting member into the circumferential groove.

\* \* \* \* \*